United States Patent
Mebberson

(10) Patent No.: US 11,564,520 B2
(45) Date of Patent: Jan. 31, 2023

(54) APPARATUS AND METHOD FOR MEASURING FLUID CONSUMPTION

(71) Applicant: PURATAP PTY LTD, Stepney (AU)

(72) Inventor: Nicholas Mebberson, Lonsdale (AU)

(73) Assignee: PURATAP PTY LTD

( * ) Notice: Subject to any disclaimer, the term of this patent is extended or adjusted under 35 U.S.C. 154(b) by 627 days.

(21) Appl. No.: 16/497,741

(22) PCT Filed: Mar. 29, 2018

(86) PCT No.: PCT/AU2018/050293
§ 371 (c)(1),
(2) Date: Sep. 25, 2019

(87) PCT Pub. No.: WO2018/176097
PCT Pub. Date: Oct. 4, 2018

(65) Prior Publication Data
US 2020/0022519 A1    Jan. 23, 2020

(30) Foreign Application Priority Data

Mar. 29, 2017   (AU) ................................ 2017901134

(51) Int. Cl.
*A47G 23/10*   (2006.01)
*A47G 19/22*   (2006.01)
(Continued)

(52) U.S. Cl.
CPC ......... *A47G 23/10* (2013.01); *A47G 19/2227* (2013.01); *B65D 47/06* (2013.01); *G01F 13/006* (2013.01); *G01F 23/804* (2022.01)

(58) Field of Classification Search
None
See application file for complete search history.

(56) References Cited

U.S. PATENT DOCUMENTS

| 4,736,871 A | 4/1988 | Luciani et al. |
| 6,212,959 B1 | 4/2001 | Perkins |
| (Continued) | | |

FOREIGN PATENT DOCUMENTS

| GB | 2457355 | 8/2009 | |
| WO | WO-2009098077 A1 * | 8/2009 | ........... G01F 23/263 |
| (Continued) | | | |

*Primary Examiner* — Paul R Durand
*Assistant Examiner* — Michael J. Melaragno
(74) *Attorney, Agent, or Firm* — Sand, Sebolt & Wernow Co., LPA

(57) ABSTRACT

There is proposed an apparatus and method for measuring fluid usage from a container. The apparatus in one form includes a proximity sensor or sensors positioned in, or adjacent, an outlet of said container and configured to monitor the presence or absence of said fluid within or adjacent said outlet, an angle sensor for determining a first angle of said container when said fluid begins to flow through the outlet, and for determining a second angle of said container when said fluid stops flowing through said outlet, and a transmitter for sending data from the proximity sensor/s and angle sensor or processed data therefrom, to a computing device and/or display unit, wherein the data or processed data is used to calculate or indicate a volume of the fluid having passed through the outlet.

12 Claims, 16 Drawing Sheets

(51) Int. Cl.
   *B65D 47/06*     (2006.01)
   *G01F 13/00*     (2006.01)
   *G01F 23/80*     (2022.01)

(56) References Cited

U.S. PATENT DOCUMENTS

| | | | |
|---|---|---|---|
| 9,151,605 B1 | 10/2015 | Sweeney et al. | |
| 9,230,423 B2 * | 1/2016 | Wu | G16H 50/30 |
| 9,320,375 B2 * | 4/2016 | Sweeney | A61B 5/024 |
| 9,327,960 B2 * | 5/2016 | Sweeney | G01B 21/22 |
| 10,188,230 B2 * | 1/2019 | Hambrock | G01F 23/804 |
| 10,252,840 B2 * | 4/2019 | Mebberson | B65D 47/061 |
| 10,433,666 B1 * | 10/2019 | Jovanov | B65D 43/0202 |
| 10,722,059 B2 * | 7/2020 | Hoffmann | A47G 23/16 |
| 10,863,852 B1 * | 12/2020 | Lyons | B01F 35/2112 |
| 11,013,353 B2 * | 5/2021 | Hambrock | A47G 23/16 |
| 11,185,179 B2 * | 11/2021 | Zimbelman | G01F 1/007 |
| 11,254,474 B2 * | 2/2022 | Pearce | B65D 47/063 |
| 11,286,921 B2 * | 3/2022 | Gray | B23P 15/00 |
| 2011/0180563 A1 | 7/2011 | Fitchett et al. | |
| 2014/0303790 A1 * | 10/2014 | Huang | G16H 20/60 |
| | | | 700/281 |
| 2014/0319170 A1 * | 10/2014 | Sweeney | A47G 19/2272 |
| | | | 220/714 |
| 2014/0354438 A1 * | 12/2014 | Hazen | A47G 19/2205 |
| | | | 73/290 R |
| 2015/0108026 A1 * | 4/2015 | Azimi | G16H 40/67 |
| | | | 206/459.1 |
| 2015/0122688 A1 | 5/2015 | Dias et al. | |
| 2015/0182797 A1 | 7/2015 | Wernow et al. | |
| 2015/0266715 A1 | 9/2015 | Wittrup et al. | |
| 2015/0359364 A1 * | 12/2015 | Sweeney | B67D 3/0051 |
| | | | 206/459.1 |
| 2015/0360927 A1 * | 12/2015 | Sweeney | A47G 23/16 |
| | | | 222/41 |
| 2016/0022209 A1 * | 1/2016 | Fraisl | A61B 5/4205 |
| | | | 600/590 |
| 2016/0025545 A1 * | 1/2016 | Saltzgiver | G01F 23/26 |
| | | | 73/304 C |
| 2016/0146659 A1 | 5/2016 | Saltzgiver et al. | |
| 2016/0220184 A1 * | 8/2016 | Manion | A61B 5/4266 |
| 2016/0286993 A1 * | 10/2016 | Pau | A47G 19/2288 |
| 2017/0067770 A1 * | 3/2017 | Sun | H04Q 9/00 |
| 2017/0238744 A1 * | 8/2017 | Sweeney | G01F 13/006 |
| 2017/0263102 A1 * | 9/2017 | Tshilombo | G01F 22/00 |
| 2017/0273488 A1 * | 9/2017 | Lonis | A47G 23/16 |
| 2017/0336240 A1 * | 11/2017 | Daneyshar | B67D 3/0061 |
| 2017/0340147 A1 * | 11/2017 | Hambrock | G01F 23/296 |
| 2018/0143062 A9 * | 5/2018 | Gurumohan | A47G 19/00 |
| 2018/0263392 A1 * | 9/2018 | Phan | B65D 51/1644 |
| 2019/0186979 A1 * | 6/2019 | Starinsky | A47G 23/16 |

FOREIGN PATENT DOCUMENTS

| | | | | |
|---|---|---|---|---|
| WO | WO-2015195693 A1 * | 12/2015 | ......... | A47G 19/2227 |
| WO | 2016044890 | 3/2016 | | |
| WO | 2016145027 | 9/2016 | | |
| WO | 2017075298 | 5/2017 | | |
| WO | WO-2017089792 A1 * | 6/2017 | ............... | A45F 3/04 |
| WO | WO-2017178980 A1 * | 10/2017 | ............... | A45F 3/16 |
| WO | WO-2018176097 A1 * | 10/2018 | ......... | A47G 19/2227 |
| WO | WO-2020223540 A1 * | 11/2020 | ............... | A45F 3/16 |

* cited by examiner

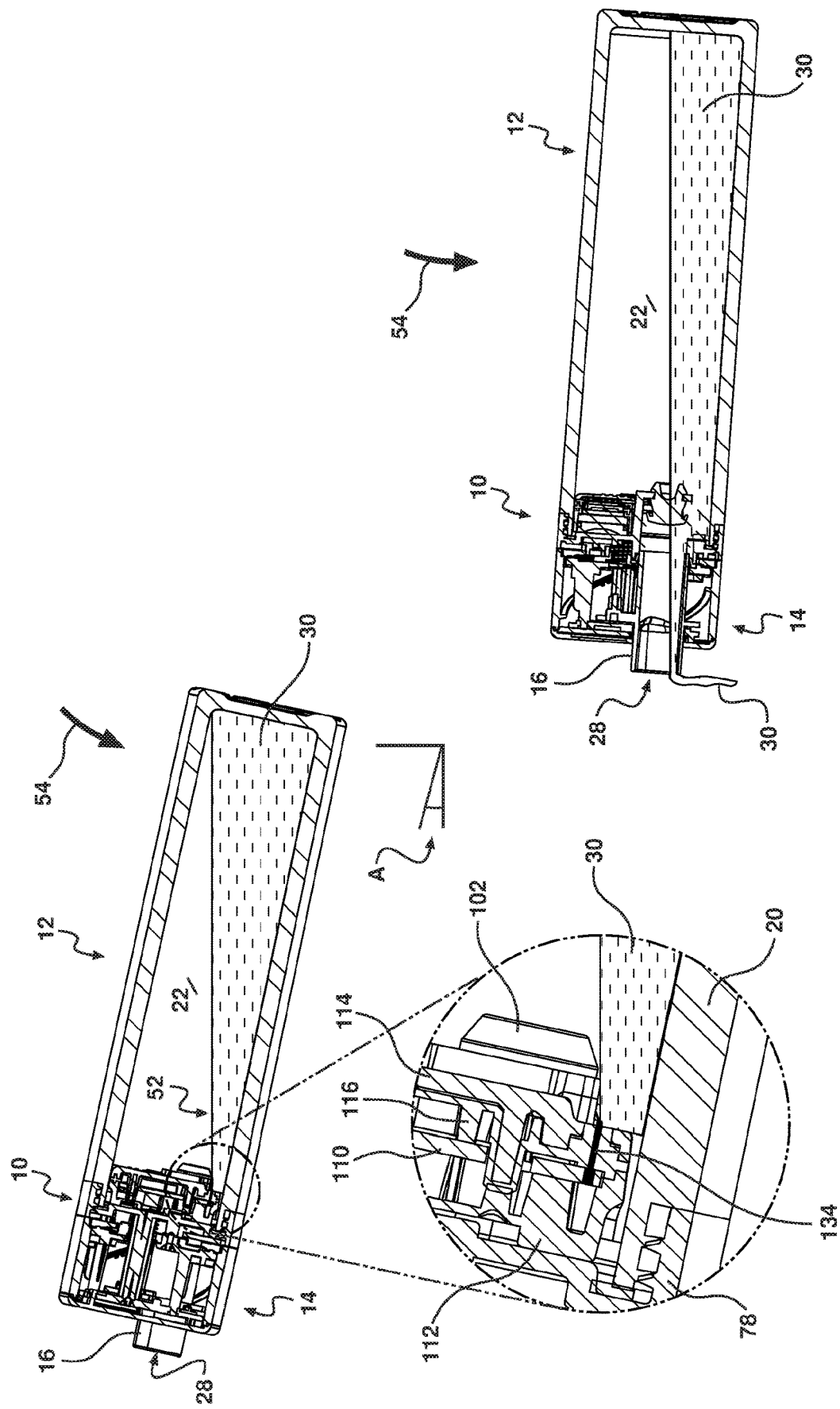

APPARATUS AND METHOD FOR MEASURING FLUID CONSUMPTION

FIELD OF THE INVENTION

The present invention relates to an apparatus and method for measuring fluid consumption by a person from a container. In particular, the invention relates to measuring a drinking event from a so-called 'smart bottle' that has wireless connectivity to a smart phone or wearable such as an activity tracker or smart watch.

BACKGROUND OF THE INVENTION

It is common nowadays for various metrics of an individual to be measured throughout the day and especially during fitness activities. These parameters are used to measure, compare and track performance of the individual, and may include heart rate, number of steps, sleep duration/quality, intensity of activity and duration. However, one of the metrics that has been difficult to measure has been an individual's hydration. This metric is very important as dehydration during exercise can have severe adverse health effects.

There have been attempts to measure water content of an individual using an infrared light embedded in a wearable, however these have shown only limited success. Various 'smart bottle' have also been released onto the market or are suggested in the published prior art that measure the amount of water consumed and send this data to a wirelessly connected activity tracker, smart watch or smart phone.

One such bottle currently on the market is sold under the H2O-Pal trade mark and comprises a thin module that attaches to the base of a water bottle, which tracks the user's water intake by way of an accelerometer and weight sensor to thereby monitor the water level within the bottle. Notifications are then sent via Bluetooth Smart® to an App on the user's phone. The problem with such devices is that the water bottle must be place down onto a hard surface between drinks for the water usage to be accurately measured, which may not be practical if for instance the person is walking.

Another device is suggested in U.S. Pat. No. 6,212,959 (Perkins) which discloses a liquid-consumption device for estimating an individual's hydration, which includes an impeller located within an outflow channel. The rate of rotation of impeller is proportional to the rate of flow of the fluid passing through the meter and therefore the user's water consumption can be calculated.

Still another device is disclosed in U.S. Patent No. 20160146659 (Saltzgiver et al.) wherein a sensor located within a bottle lid is configured to track changes in a liquid level within a container. The sensor comprising an ultrasonic liquid level sensor configured to indicate the level of the liquid within the container.

The existing 'smart bottle' devices however suffer from various problems, including the expense of the components, power efficiency and in the case of the impeller disclosed in Perkins, may include components are difficult to clean or may become clogged during use.

The phrase "proximity sensor" used throughout the specification should be understood to encompass any type of sensor or switch that is used to detect the presence of a fluid, such as water, at a specific location within a container.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

In one aspect of the invention, but not necessarily the broadest or only aspect, there is proposed an apparatus for measuring fluid usage from a container, including:
 a proximity sensor or sensors positioned in, or adjacent, an outlet of said container and configured to monitor the presence or absence of said fluid within or adjacent said outlet;
 an angle sensor for determining a first angle of said container when said fluid begins to flow through the outlet, and for determining a second angle of said container when said fluid stops flowing through said outlet; and
 a transmitter for sending data from the proximity sensor and angle sensor or processed data therefrom, to a computing device and/or display unit;
 wherein the data or processed data is used to calculate or indicate a volume of the fluid having passed through the outlet.

In one form the apparatus further includes a controller for receiving said data from the proximity sensor or sensors, and the angle sensor, wherein said data or processed data from the sensors is transferred to the transmitter for transmission thereof.

In a preferred form the proximity sensor comprises at least two fluid contact pins. Wherein when two or more contact pins are submerged in a fluid a weak electrical current is caused to flow therebetween, to indicate the presence of said fluid. The skilled addressee will appreciate that water which contains even very dilute concentrations of substances, such as minerals, will carry an electrical current. Accordingly, the apparatus may be configured to detect water at a specific location within a container even when the conductivity of the water is as low as 8-10 ppm.

In one form the at least two fluid contact pins may be positioned in a spaced apart configuration on a generally horizontal plane.

In a preferred form, a first contact pin is located on one side of the spout and three spaced apart secondary contact pins are located on an opposite side of the spout, such that when an elongate bottle is positioned in a generally horizontal arrangement the three secondary contact pins are spaced apart along a generally vertical axis. While the lowest of the three secondary contact pins and the first contact pin are positioned generally along a horizontal plane and the middle and upper secondary contact pins are set progressively higher relative to the first contact pin. In this way as the height of the water increases, i.e. as the bottle is tilted from a vertical position into a horizontal position, the secondary contact pins are progressively covered and a weak electrical current is sequentially caused to flow between the first and each of the secondary contact pins as they are covered. This improves the accuracy of the proximity sensor and overcomes some of the issues associated with water slop within the bottle. The same improvement in accuracy occurs when the bottle is lowered into the upright or vertical position.

In still another form the at least two fluid contact pins or multiple proximity sensors may be located within the spout and spaced apart along a generally vertical axis. The reader should however appreciate that the number and configuration of contact pins could be altered without departing from the scope of the invention.

Preferably, said volume of the fluid having passed through the outlet is used to calculate fluid consumption by a user, which is then used to determine the approximate hydration of said user.

Preferably, the container is a bottle having a known volume. The bottle may be portable and graspable by said user. The outlet preferably comprises a spout by which the user can drink or otherwise access the fluid from within the container.

In one form said volume of the fluid having passed through the outlet may be during a single drinking event or pouring event.

The volume of fluid remaining within the container after said single drinking or pouring event can be calculated to indicate when the container requires refilling.

The container in one form is a bottle that includes a base adjoining an upwardly extending circumferential wall delineating a chamber or reservoir for holding the fluid. A reversibly attachable lid assembly is connected to a top circumferential edge of said wall for sealing the chamber or reservoir. The spout is preferably movable along a generally vertical axis and attached to an upper part of the lid assembly and is closable or sealable.

In one form the circumferential wall is generally cylindrical and vertically elongate, wherein a generally disc-shaped lid assembly is attached over an open upper end of the container.

The spout may be central of the disc-shaped lid assembly or in a preferred form the spout may be off-set from a centre point of the disc-shaped lid assembly.

The apparatus may include a rotation sensor for determining the location of the proximity sensor or sensors relative to a longitudinal axis of the container when tilted.

The apparatus may further include a processor for processing the data from the sensors before the processed data is sent to the computing device and/or display unit by way of the transmitter. The computing device may undertake further processing of said data. Alternatively, the data from the sensors is sent directly to the computing device which undertakes all the processing of said data.

The processor or controller is preferably a microprocessor or microcontroller with low power requirements.

The apparatus preferably includes a power source such as a battery. The battery may be a button cell battery and is preferably held within the lid assembly. The button cell battery may be retained within a tamper resistant housing to inhibit access by unauthorised persons, such as small children. In one form the tamper resistant housing includes a locking member that retains the button cell battery, wherein the locking member can only be unlocked by a cooperating tool. In other forms the battery may be rechargeable, either by removing the battery or in situ using a cable or portable recharging unit. Alternatively, a recharging unit may be incorporated into the apparatus for recharging the battery.

The computing device or display unit may be a smart phone, activity tracker, smart watch, wearable or portable display means, laptop, tablet or other personal computing device.

In one form the data or processed data may be displayed on a user-friendly display module of the computing device.

The apparatus may further include an accelerometer for measuring the acceleration of the bottle, to estimate or calculate a rate of slop if the container is tilted rapidly.

Preferably the movement of the container is measured along three axes to therefore calculate the orientation and tilt of the container.

The apparatus may include flash memory to store the data or processed data when the computing device or display unit are not paired to the apparatus.

In another aspect of the invention there is proposed a lid assembly for attachment to a container, for measuring fluid usage therefrom, including:

a proximity sensor or sensors positioned in, or adjacent, an outlet of said lid assembly and configured to monitor the presence or absence of said fluid within or adjacent said outlet;

an angle sensor for determining a first angle of said lid when said fluid begins to flow through the outlet, and for determining a second angle of said container when said fluid stops flowing through said outlet; and a transmitter for sending data from the proximity sensor and angle sensor or processed data therefrom, to a computing device and/or display unit; wherein the data or processed data is used to calculate or indicate a volume of the fluid having passed through the outlet, to thereby calculate fluid consumption by a user.

In still another aspect there is proposed a container having an outlet including an apparatus for measuring fluid usage therefrom in accordance with any of the above.

In still another aspect of the invention there is proposed a method of measuring fluid usage from a container, including the steps of:

locating a proximity sensor or sensors within or adjacent an outlet of said container, the proximity sensor or sensors configured to monitor the presence or absence of said fluid within or adjacent said outlet;

attaching an angle sensor to said container, the angle sensor configured to measure a first angle of said container when said fluid begins to flow through the outlet, and configured to measure a second angle of said container when said fluid stops flowing through said outlet;

attaching a transmitter to said container, the transmitter configured to send data collected by the proximity sensor and angle sensor or a processed data therefrom, to a computing device and/or display unit;

inclining the container in a first direction such that the fluid is caused to contact said proximity sensor or sensors and flow out through said outlet, wherein the angle sensor measures said first angle;

moving the container in a second direction such that the fluid disengages from said proximity sensor or sensors and stops flowing out through said outlet, wherein the angle sensor measures said second angle, the time between when the fluid is caused to flow out through said outlet and when the fluid stops flowing out through said outlet demarcating an event;

calculate a volume of the fluid having passed through the outlet during said event; and displaying an indicia to a user indicating said volume of the fluid having passed through the outlet during said event or information relating thereto.

Preferably said event is a drinking event. More preferably the fluid is a non-viscous fluid, such as but not limited to water.

The indicia may be the volume of fluid consumed during the drinking event measured in millilitres or fluid ounces. Alternatively, the processor of the apparatus or a wirelessly linked computing device may calculate the amount of fluid required by a user depending upon their age, fitness, climate, activity and time of day, to thereby display the indicia as a percentage of the total amount of fluid that is required by the user to remaining adequately hydrated.

The processor or controller of the apparatus or a wirelessly linked computing device may also be in communication with a display unit attached to the bottle or container, for instance coded red, orange, green LED lights, that indicate if the required amount of fluid has been consumed by the user.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings.

FIG. 12d is a side cross-sectional view of the lid assembly, apparatus and bottle of FIG. 12a in a second tilted position illustrating the water contacting the proximity sensors;

FIG. 12e is a side cross-sectional view of the lid assembly, apparatus and bottle of FIG. 12a in a third tilted position illustrating the water flowing out through the outlet;

FIG. 13b is an underside view of the communication module of FIG. 13a;

FIG. 13c is an underside perspective view of the communication module of FIG. 13a;

FIG. 13d is a rear view of the communication module of FIG. 13a;

FIG. 15 is a circuit layout diagram of one embodiment of the communication module of FIG. 13a.

DETAILED DESCRIPTION OF THE ILLUSTRATED AND EXEMPLIFIED EMBODIMENTS

Figure 1:
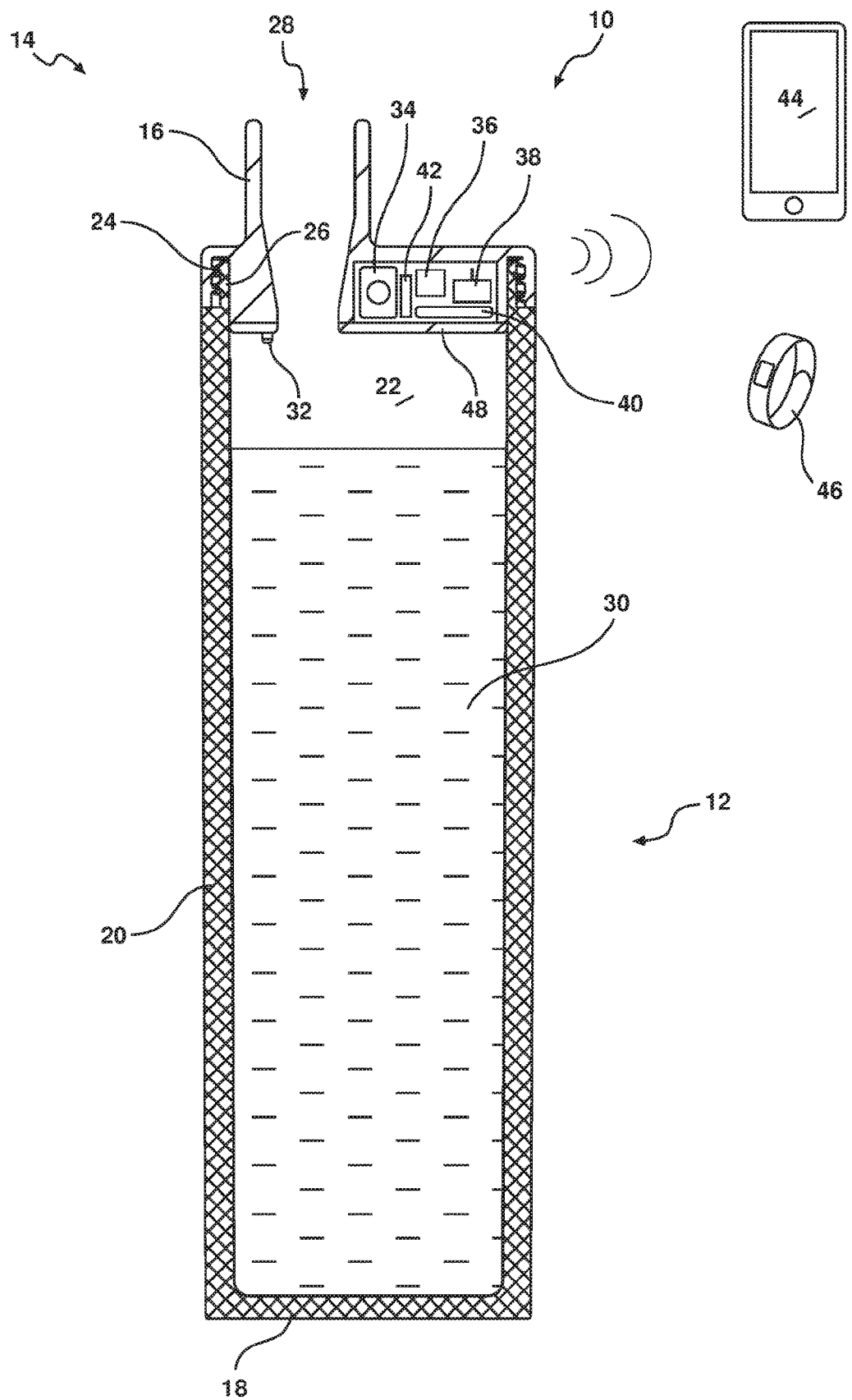
FIG. 1 is a side cross-sectional view of one embodiment of the apparatus of the present invention attached to a bottle.

Similar reference characters indicate corresponding parts throughout the drawings. Dimensions of certain parts shown in the drawings may have been modified and/or exaggerated for the purposes of clarity or illustration.

Referring to the drawings for a more detailed description, there is illustrated an apparatus 10 for measuring a change in fluid level within a container 12, demonstrating by way of examples, arrangements in which the principles of the present invention may be employed. The reader should appreciate that the apparatus 10 will be primarily described with reference to use in conjunction with a bottle 12 having a lid 14 with an offset spout 16, however it should be understood that the invention is not limited to this particular application and other types of containers and spouts could be used without departing from the scope of the invention, for instance, the spout 16 may be central of the lid 14.

Turning to FIG. 1, there is illustrated one embodiment of the apparatus 10 for measuring fluid consumption from a bottle 12 having a lid or lid assembly 14. The bottle 12 having a base 18 adjoining an upwardly extending circumferential wall 20 that forms a chamber 22 of known volume. The lid assembly 14 is attached to the bottle 12 by way of a threaded portion 24 that cooperates with a thread 26 on a top of the circumferential wall 20. The lid assembly 14 may be fixedly attached to the top of the bottle 12 such that the lid assembly 14 cannot be removed from the bottle 12, or the lid assembly 14 may reversibly engage the circumferential wall 20. Other engagement members could be used such as frictional engagement or the lid may be heat welded to the bottle 12.

The lid assembly 14 of the present embodiment includes a fixed spout 16 that forms the outlet 28 through which the contents 30, such as water, can be accessed by a user.

A proximity sensor 32 is positioned adjacent the outlet 28 to monitor the flow of water through the outlet 28. The reader should however appreciate that the proximity sensor 32 may be located within the outlet and may comprise two or more sensors or sensor elements. Unlike some other bottle systems currently available or suggested in the prior art, the proximity sensor 32 does not measure the actual flow rate through the outlet, rather it measures the presence or absence of the fluid 30 within or adjacent the outlet 28, which will become clearer throughout the detailed description.

Figure 5:
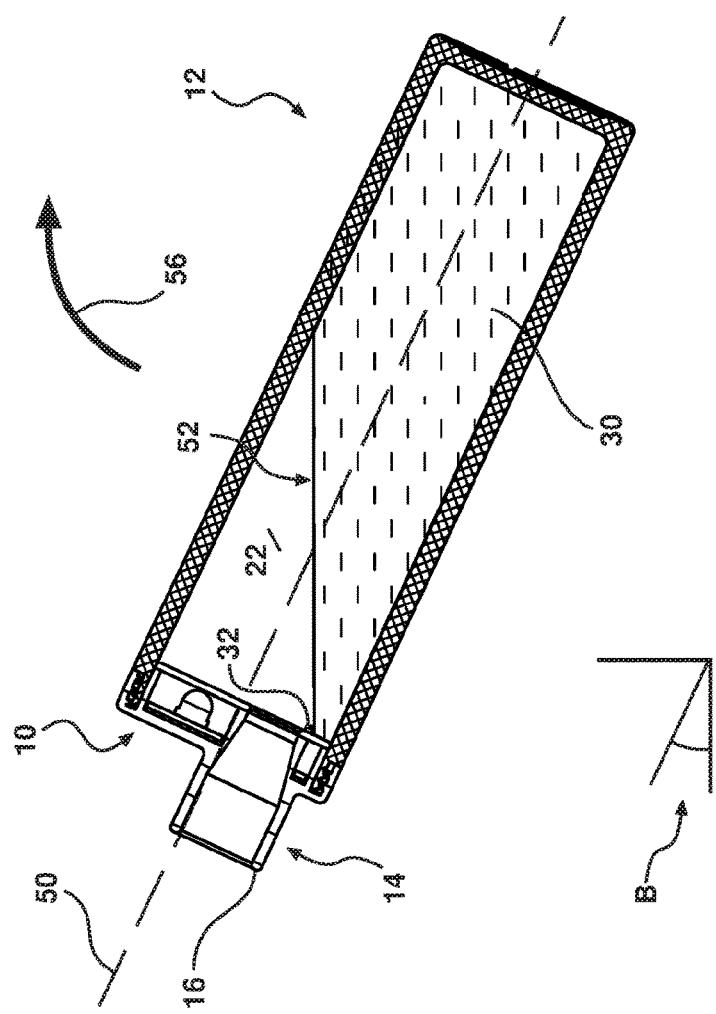
FIG. 5 is a side cross-sectional view of the apparatus, lid assembly and bottle of FIG. 2 being tilted in an opposite direction into a third tilted position wherein the water level drops back below the proximity sensor.

The apparatus 10 further includes an angle sensor 34 for determining or measuring a first angle A of the bottle 12 when the fluid 30 begins to flow through the outlet 32, as will be discussed with respect to FIG. 3. The angle sensor 34 is also used to determine or measure a second angle B of the bottle 12 when the fluid 30 stops flowing through the outlet 28, as will be discussed with respect to FIG. 5.

Turning back to FIG. 1 the apparatus 10 further includes a controller or processor 36, a transmitter 38 and a power source 40. The processor 36 is configured to process the data from the proximity sensor 32, angle sensor 34 and any other relevant sensors, such as but not limited to, an axial sensor 42 for measuring the rotation of the bottle 12 around a longitudinal axis. The processed data is then sent to the transmitter 38.

The controller or processor 36 is configured to calculate a volume of the fluid having passed through the outlet 28, by comparing the angle of the bottle 12 when the fluid 30 begins to flow through the outlet 28, with the angle of the bottle 12 when the fluid 30 stops flowing through the outlet 28.

Since fluid, such as water, will find its natural level that corresponds to a horizontal plane, the less fluid that is within chamber 22 the greater angle to which the bottle 12 must be titled for the fluid 30 to flow out of outlet 28. Since the capacity of chamber 22 is known the processor 36 can calculate the volume of the fluid within the bottle at an angle when the fluid makes contact with, or ceases to contact, the proximity sensor 32.

The transmitter 38 then wirelessly transmits the processed data via a short-range network, to a computing device and/or display unit, such as a smartphone 44 or activity tracker 46 to display the volume of the fluid having passed through the outlet 28, such as during a drinking event. The short-range network may be an independent low power radio network, BLUETOOTH® or BLUETOOTH® Low Energy (BLE).

The reader will however appreciate that the data from the sensors 32, 34, 42 could be sent directly to an external computing device and/or display unit 44, 46.

The processed data or data from the sensors 32, 34, 42 can then be used by the computing device and/or display unit 44 or 46 to estimate the hydration of the user and notify them if they require more hydration or are adequately hydrated.

The sensors 34, 42, processor 36, transmitter 38 and power source 40 are retained within a sealed housing 48. The sealed housing 48 protects the components from the fluid 30 and from unauthorised tampering. The sealed housing 48 may be unitary with the lid 14 or may be detachable therefrom, whereby the bottle 12 and lid assembly 14 can be washed without damaging the components within the sealed housing 48. Various seals and wiring may be used to seal and connect the components but will not be discussed in detail since they would be obvious to a person skilled in the art.

FIGS. 2 to 5 illustrate a second embodiment of the apparatus 10 comprising a bottle 12, lid assembly 14 with fixed spout 16, proximity sensor 32 and angle sensor 34. For the purpose of clarity, some of the components detailed in FIG. 1 are not illustrated or discussed.

Figure 2:
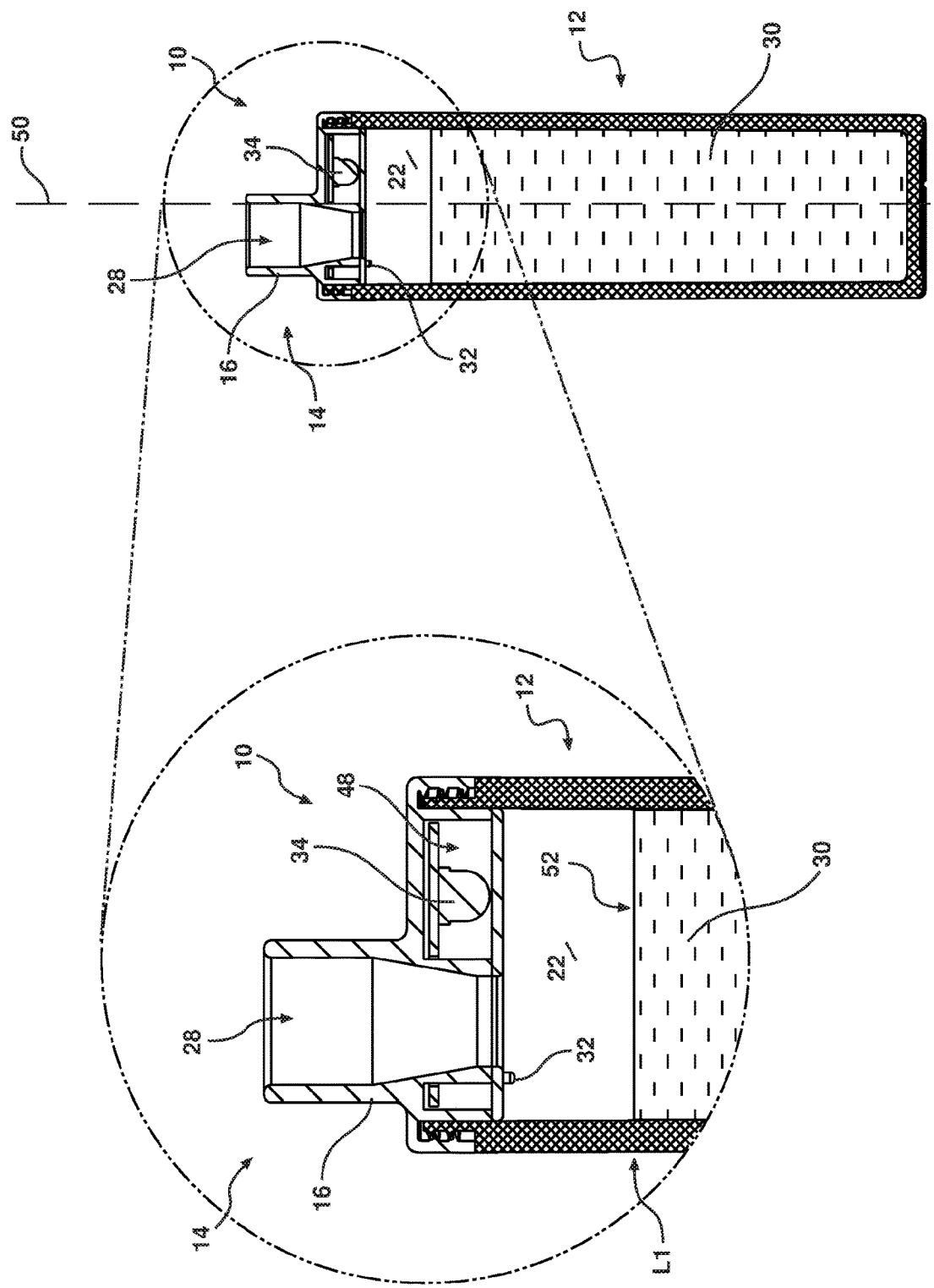
FIG. 2 is a side cross-sectional view of a second embodiment of the apparatus, lid assembly and bottle in a vertical position.

Turning to FIG. 2 the bottle 12 is shown in an upright position wherein a longitudinal axis 50 of the bottle 12 aligns the vertical. The fluid 30 contained within the chamber 22 will naturally find its own level that aligns a horizontal plane, thereby being perpendicular to the longitudinal axis 50 when the bottle 12 is upright. The surface level 52 of the fluid 30 is therefore spaced apart from the proximity sensor 32.

Figure 3:
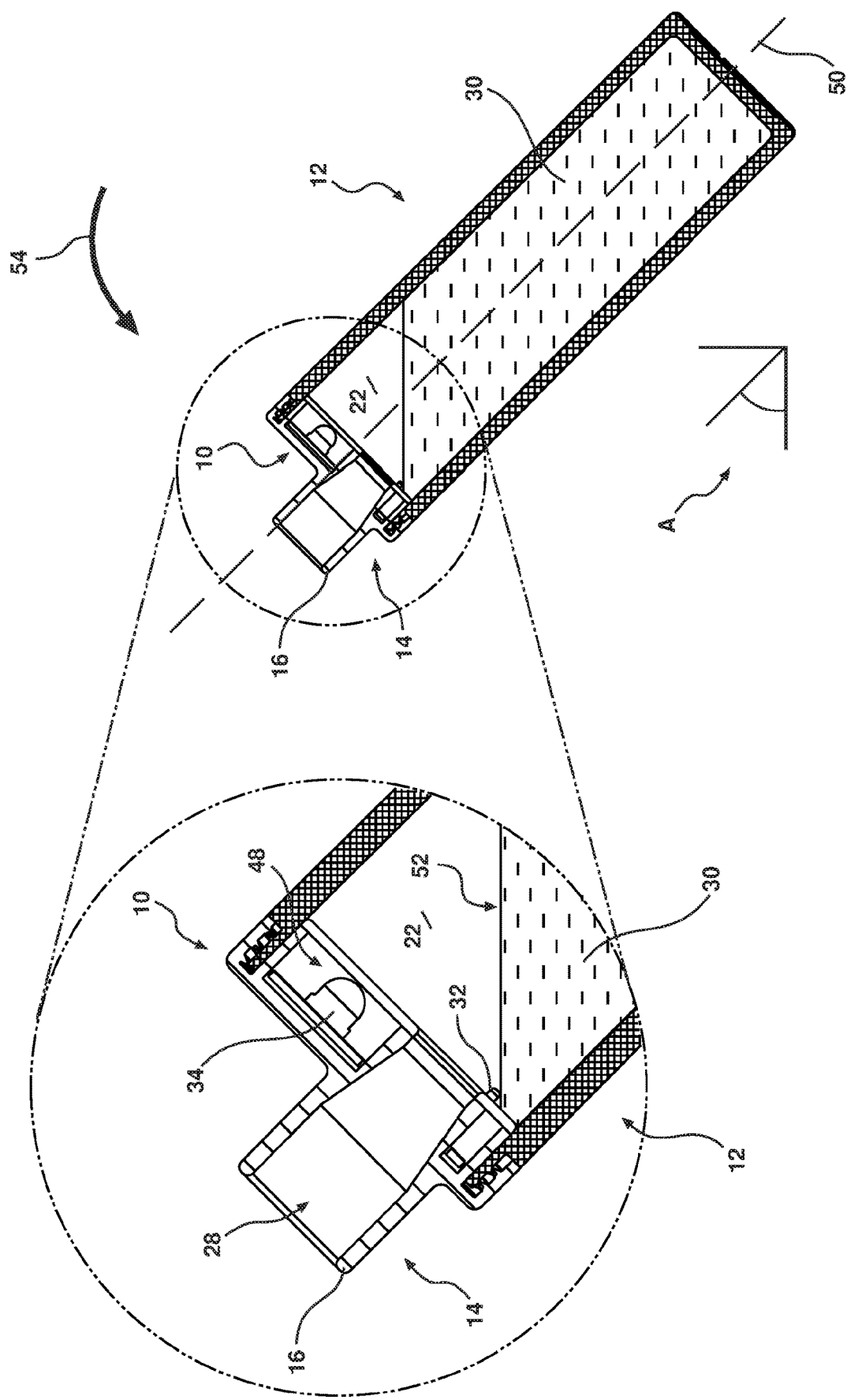
FIG. 3 is a side cross-sectional view of the apparatus, lid assembly and bottle of FIG. 2 in a first tilted position wherein the water level contacts the proximity sensor.

As the bottle 12 is tilted in the direction of arrow 54, as illustrated in FIG. 3, the surface level 52 of the fluid 30 remains generally on the horizontal plane. However, since the longitudinal axis 50 of the bottle 12 is moving away from the vertical the surface level 52 of the fluid 30 comes into contact with the proximity sensor 32. Once the presence of fluid 30 is detected by the proximity sensor 32 the angle sensor 34 is configured to determine the first angle A of the bottle 12. Since the dimensions of the bottle 12 are known the volume can be calculated when the bottle is tilted at the first angle A.

Figure 4:
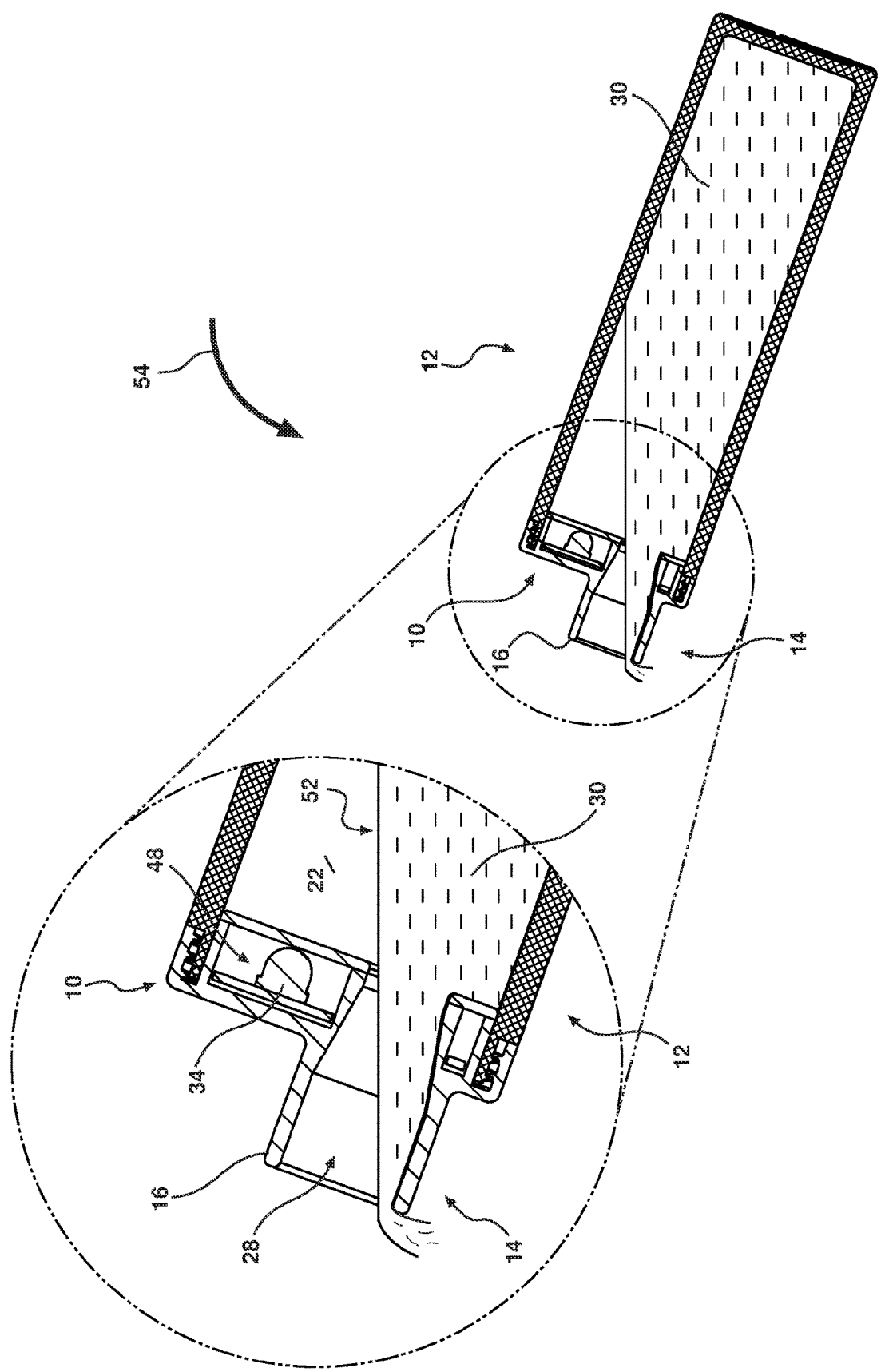
FIG. 4 is a side cross-sectional view of the apparatus, lid assembly and bottle of FIG. 2 in a second tilted position wherein the water flows out through the outlet.

As the bottle 12 continues to be tilted in the direction of arrow 54, as illustrated in FIG. 4, the water 30 flows out through the outlet 28. This can be during a drinking event or when the fluid is being poured into a receptacle for drinking by the user. Once the drinking or pouring event has finished the bottle 12 is tilted in an opposite direction, as indicated by arrow 56 in FIG. 5, wherein the surface level 52 of the fluid 30 drops back below the proximity sensor 32. At this point the angle sensor 34 is configured to determine the second angle B of the bottle 12, and therefore the volume of the remaining fluid can be calculated.

Figure 6:
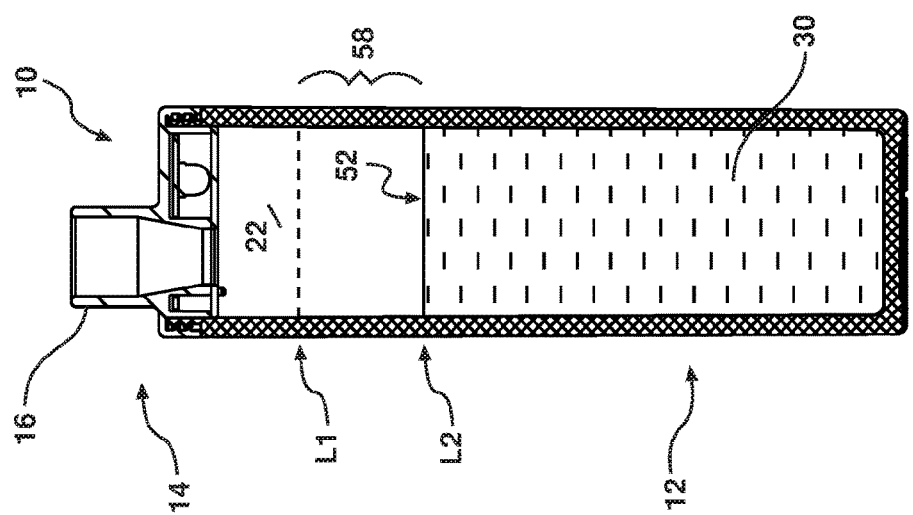
FIG. 6 is a side cross-sectional view of the apparatus, lid assembly and bottle of FIG. 2, illustrating the decrease in water level from a first level L1 to a second level L2.

The difference 58 between the initial level L1 and the subsequent level L2 as shown in FIG. 6 can then be calculated, to thereby determine the volume of the drinking event. This can then be used in conjunction with data from other monitors such as a heart rate monitor, activity tracker, smart watch and/or meteorological sensor, to calculate a user's fluid requirements and whether the volume of the drinking event was sufficient in light of the activity being undertaken to maintain the user's correct hydration.

Turning to FIGS. 7a to 12g there is illustrated a third embodiment of the apparatus 10, wherein the lid assembly 14 includes a retractable spout 16.

The operation of the retractable spout 16 has been previously disclosed in PCT/AU2015/050567 entitled BOTTLE LID ASSEMBLY WITH RETRACTABLE SPOUT in the name of the present Applicant, and which is hereby incorporated by reference. Accordingly, some of the detail of the retractable spout assembly will not be repeated to not obscure the present invention. The reader should however appreciate that the apparatus 10 can be incorporated into any spout or opening, whether it is retractable or fixed, or whether it is centrally located in the lid or offset from a centre point.

Figure 7A:
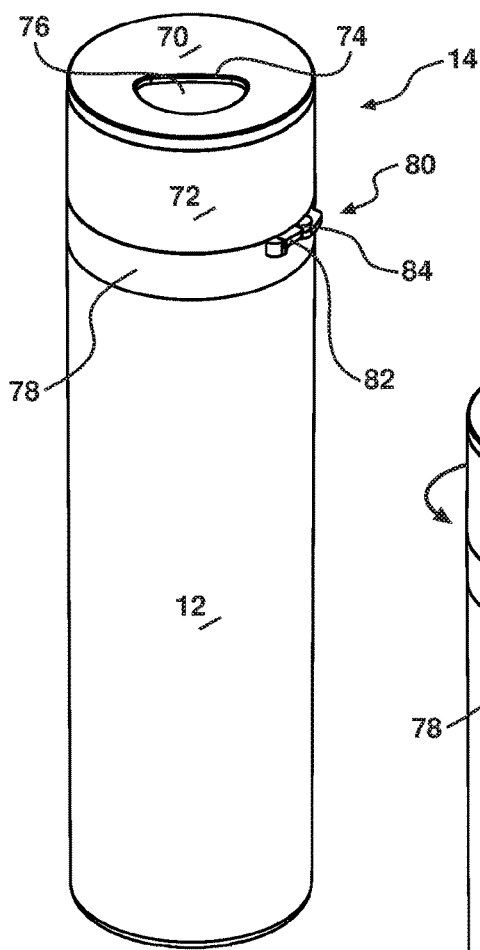
FIG. 7a is a perspective view of another embodiment of the lid assembly of the present invention having an opening that is covered by a pivotable flap concealing a retractable spout.
Figure 7B:
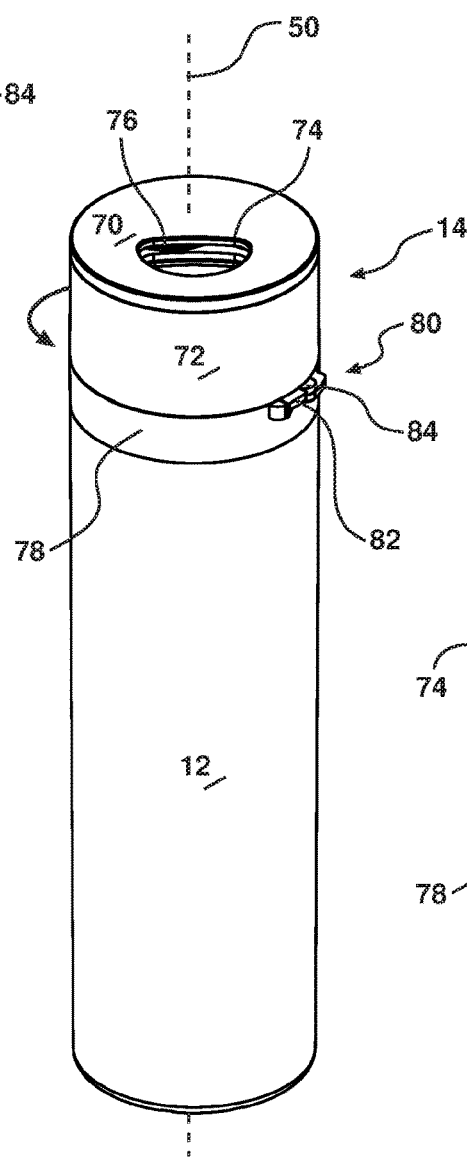
FIG. 7b is a perspective view of the lid assembly and bottle of FIG. 7a illustrating the movement of the main body of the lid assembly and the pivotable flap.
Figure 7C:
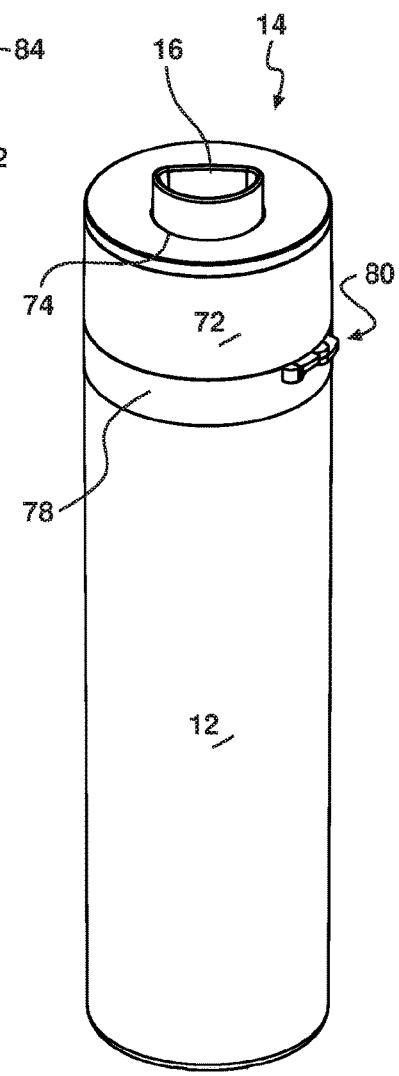
FIG. 7c is a perspective view of the lid assembly and bottle of FIG. 7a illustrating the spout in an extended position.

FIG. 7a illustrates the bottle 12 and lid assembly 14 having the apparatus 10 retained therein. The lid assembly 14 includes a top cover 70, a rotatable main body 72 and a movable spout 16. The top cover 70 includes an opening 74 that can be closed by a pivotable flap 76. The spout 16 is configured for biased movement along a first axis that is parallel with the longitudinal axis 50 of the bottle 12 between a retracted position, as illustrated in FIG. 7a, in which the spout 16 is located within the main body 72 and below the cover 70, and an extended position, as illustrated in FIG. 7c, in which the spout 16 extends through the opening 74 in the cover 72.

The lid assembly 14 can be attached to any shape or size of bottle 100, although in the present embodiments the bottle is generally cylindrical in shape.

The lid assembly 14 further includes a base member 78 configured for connection to the bottle 12, as previously discussed. As disclosed in PCT/AU2015/050567 the top cover 70 and base member 78 are held in a fixed relationship and the main body 72 is able to rotate therebetween around the longitudinal axis 50 between first and second positions.

A releasable latch mechanism 80 comprising a button 82 and locking device 84 provides a means for triggering the spout 16 to move from the retracted position into the extended position. As the main body begins to rotate, as illustrated in FIG. 7b, the pivotable flap 76 clears the opening 74 to enable the spout 16 to move upwardly therethrough, from the retracted position to the extended position. In the extended position, as shown in FIG. 7c, a person can use the spout 16 to access the fluid 30 contained within the bottle 12.

When the user has finished drinking or pouring fluid from the spout 16, they can then grasp the outer surface of the main body 72 and manually rotate it against the bias into the closed position, wherein the spout 16 is retracted and the pivotable flap 76 closes opening 74. The latch mechanism 80 maintains the spout 16 in the closed position against the bias until the button 82 is actuated by the user.

Figure 8:
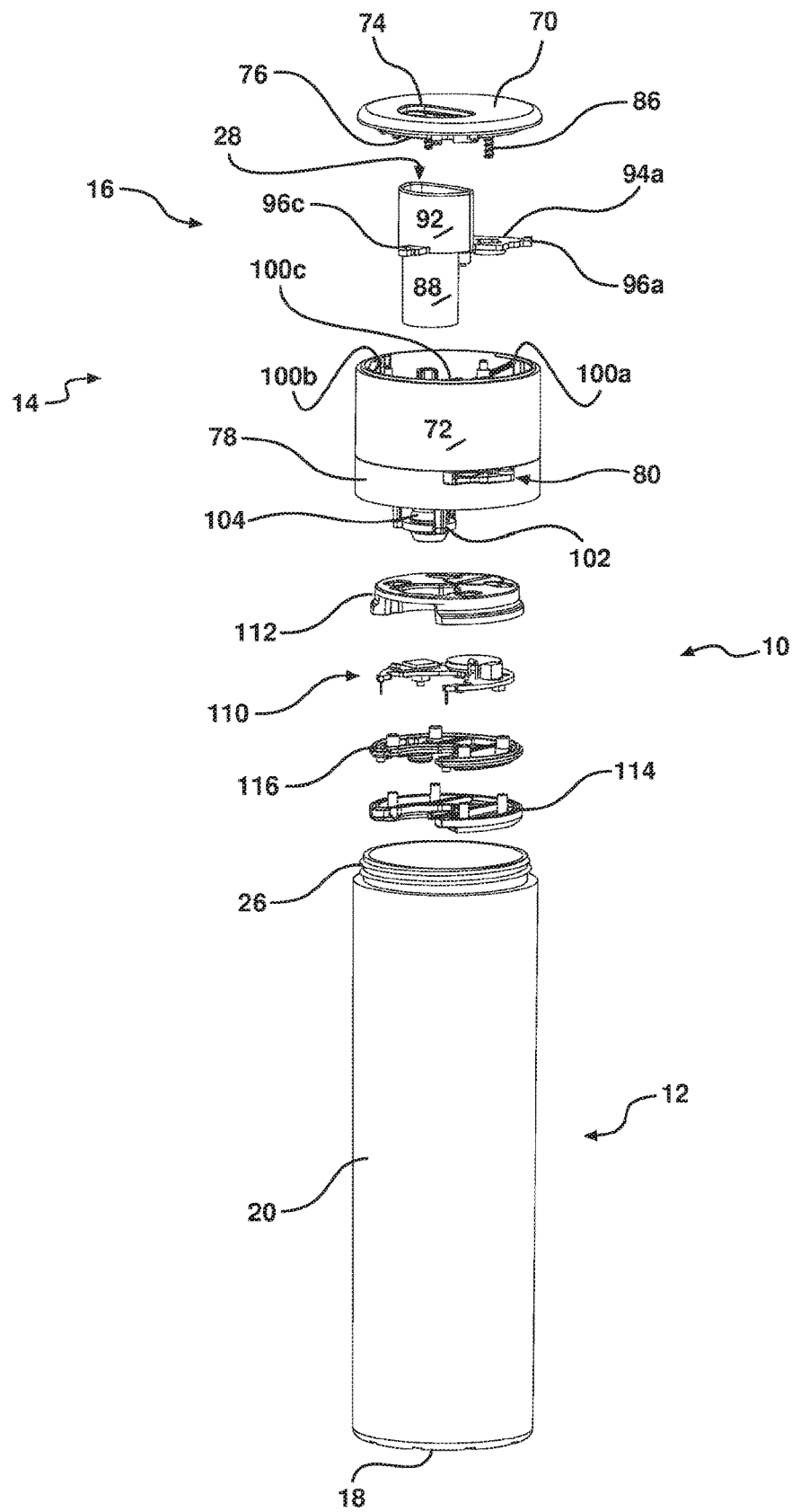
FIG. 8 is an exploded view of the lid assembly and bottle of FIG. 7a, illustrating the components of a third embodiment of the apparatus.

FIG. 8 illustrates an exploded view of the lid assembly 14, wherein the top cover 70 can be fixed relative to the base member 78 by way of fixing members 86. The spout 16 includes a body portion 88 incorporating a fluid pathway 28 that is bounded at an upper part by a mouthpiece 92. A set of arms 94a, 94b and fingers 96a, 96b, 96c extend sidewardly from the body portion 88 and the arms 94a, 94b include respective apertures 98.

The main body 22 in the present embodiment is formed as a cylindrical tubular member with inwardly projecting flanges 100a, 100b, 100c in the form of a flight or three start thread. The fingers 96a, 96b, 96c abut an upper edge of the inwardly projecting flanges 100a, 100b, 100c and act as a guide when the spout 16 is moving between retracted and extended positions.

The base member 78 includes a depending seal button seat 102 that is sidewardly open and configured to hold a seal button 104. When the spout 16 is in the retracted position, the lower rim of the body portion 88 of the spout 16 bears against an upper face of the seal button 104 and thus fluid from the bottle 100 cannot enter into the fluid pathway 28 of the spout 16. When the spout 16 is in the extended position, the lower rim of the body portion 88 is well clear of the seal button 104 and thus fluid from the bottle 100 can flow through the apertures formed in the side of the seal button seat 102 and into the fluid pathway 28 of the spout 32. The reader should however appreciate that other seal configurations could be used.

As further illustrated in FIG. 8 the apparatus 10 includes a support frame 110, a housing 112, a cover 114 and a seal member 116. The components attached to the support frame 110 will be discussed with respect to FIG. 9.

Various fixing means and seals are used to construct the lid assembly 14 which are not currently illustrated but which would be obvious to a person skilled in the art. Details of some of the fixing means and seals, and the operation of the moveable spout are detailed in PCT/AU2015/050567, incorporated herein by reference.

Figure 9:
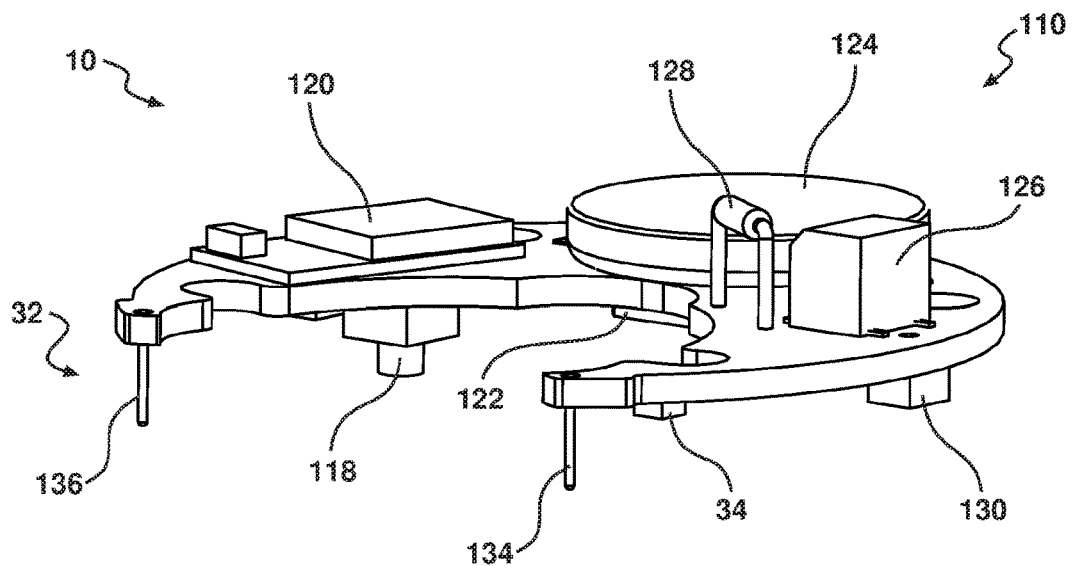
FIG. 9 is a perspective view of an apparatus support frame of FIG. 8.

The support frame 110 provides a structure to which a number of components are attached, as illustrated in FIG. 9. These components of the present embodiment, include a main power button 118, Bluetooth® radio module 120, microcontroller (MCU) 122, battery 124, tilt switch 126, reed switch 128, LED indicator 130, angle sensor (e-compass) 34, and a proximity sensor 32 in the form of fluid contact pins 134, 136.

When the fluid level contacts both the fluid contact pins 134, 136 a weak electrical current passes therebetween, which indicates that the fluid is about to move out through the spout 16, as will be discussed with respect to FIG. 12d. When the fluid level drops back below fluid contact pins 134, 136 the weak electrical current ceases, which indicates that the fluid is no longer flowing out through the spout 16, as will be discussed with respect to FIG. 12f.

The reader should however appreciate that other types of proximity sensors could be used without departing from the scope of the invention, for instance the proximity sensor may be in the form of a float switch or an inductive sensor. Furthermore, although the short-range communication is envisaged to be undertaken using Bluetooth® technology, other forms of short range communication could be used without departing from the scope of the invention.

Figure 10:
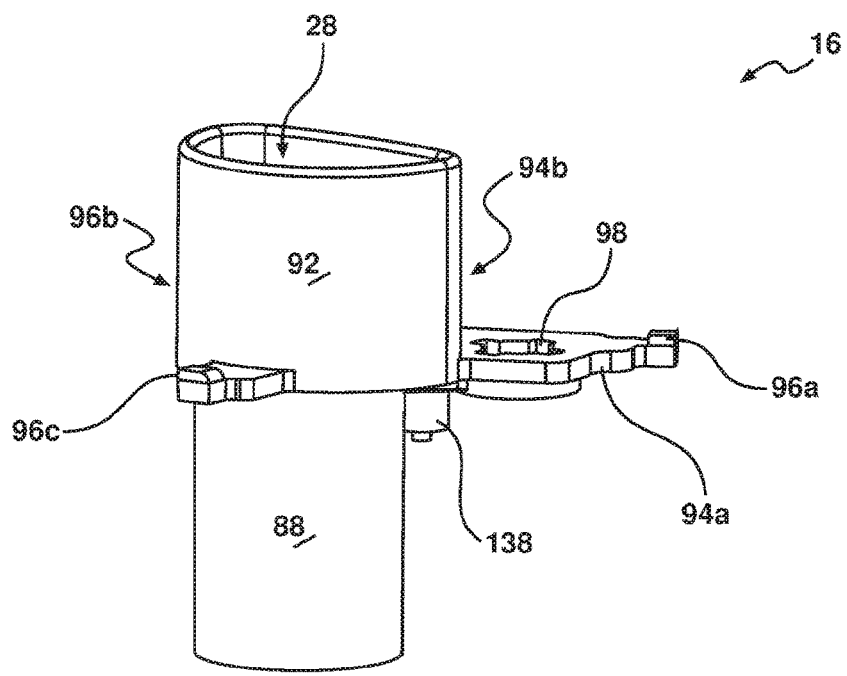
FIG. 10 is a perspective view of the spout of FIG. 8.

To conserve battery life the reed switch 128 is used to switch the apparatus 10 On and Off, or between active and standby modes. The reed switch 128 is activate by a magnet 138 that is attached to the spout 16, as illustrated in FIG. 10.

Figure 11A:
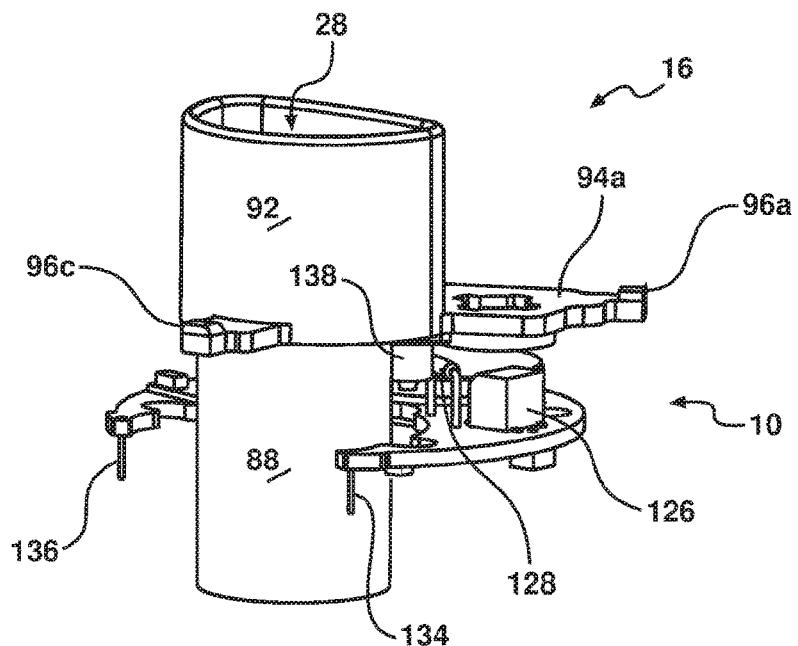
FIG. 11a is a perspective view of the spout and apparatus support frame of FIG. 8, illustrating the magnet adjacent the reed switch.
Figure 11B:
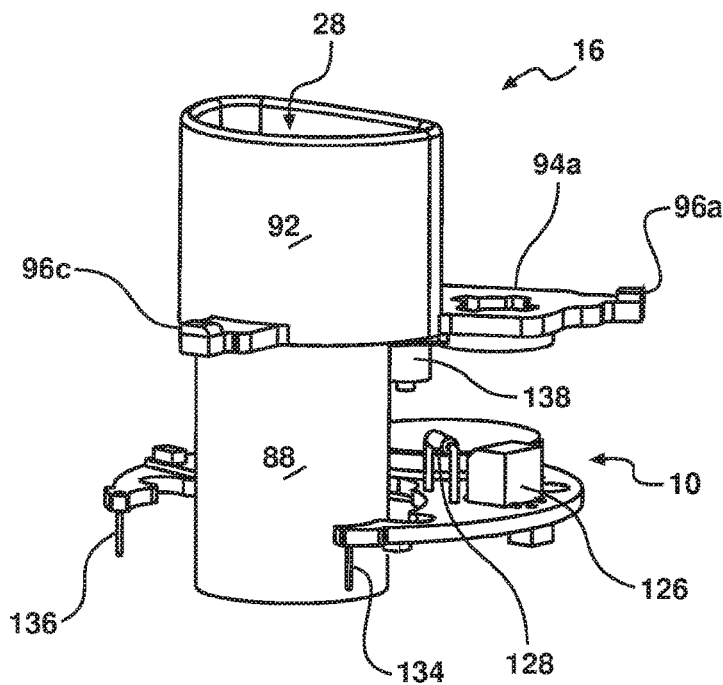
FIG. 11b is a perspective view of the spout and apparatus support frame of FIG. 11a, illustrating the magnet spaced apart from the reed switch.

FIGS. 11a and 11b illustrate the support frame 110 and spout 16 in isolation from the other components of the lid assembly 14, to thereby illustrate the operation of the reed switch 128. FIG. 11a illustrates the spout 16 in a retracted position being fully contained within the lid assembly 14. In this retracted position, the magnet 138 is in close proximity to the reed switch 128. Accordingly, the electronics of the apparatus 10 are configured to place the components in a standby mode or switch the powered components Off, since the bottle 12 is closed and no drinking event will occur.

When the lid assembly 14 is operated to raise the spout 16 into an extended position, as illustrated in FIG. 11b, the magnet 138 moves away from the reed switch 128. The electronics of the apparatus 10 are then configured to power up the relevant components of the apparatus 10 since a drinking or pouring event is likely to occur within a short period of time. When the spout 16 is moved back into the retracted position the powered components of the apparatus 10 are then powered down into the standby or Off mode.

Since the powered components of the apparatus 10 are only in an active state when the spout 16 is in the extended position, the bottle 12 can be positioned at any angle when closed without the proximity sensors 32 being activated because the apparatus is in the standby or Off mode.

In this way the battery 124 is only used during a period or periods of time that a drinking event is likely to occur. The reader should however appreciate that the battery may still power certain components, such as a display on the bottle 12 or LED indicator 130 when the bottle 12 is in a closed configuration with the spout 16 retracted. Therefore, in the standby or Off modes some limited power from the battery 124 may be used.

Figure 12C:
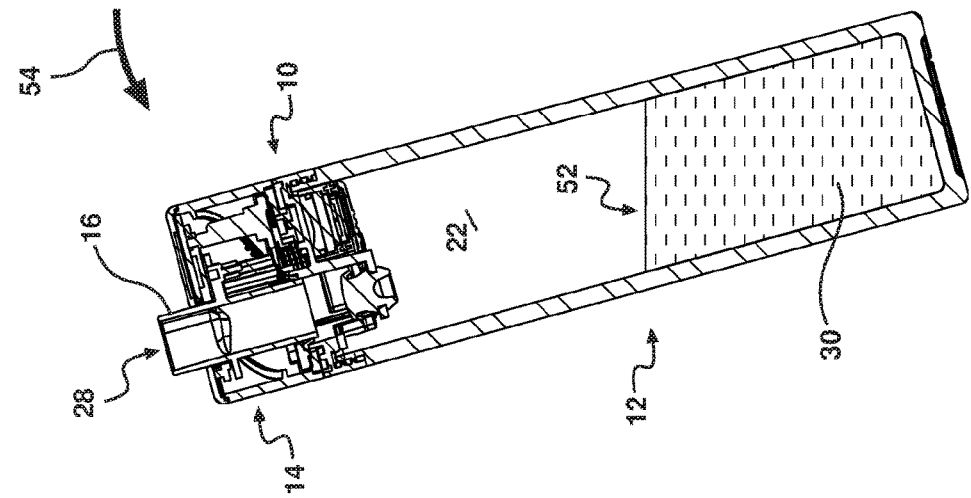
FIG. 12c is a side cross-sectional view of the lid assembly, apparatus and bottle of FIG. 12a in a first tilted position.
Figure 12B:
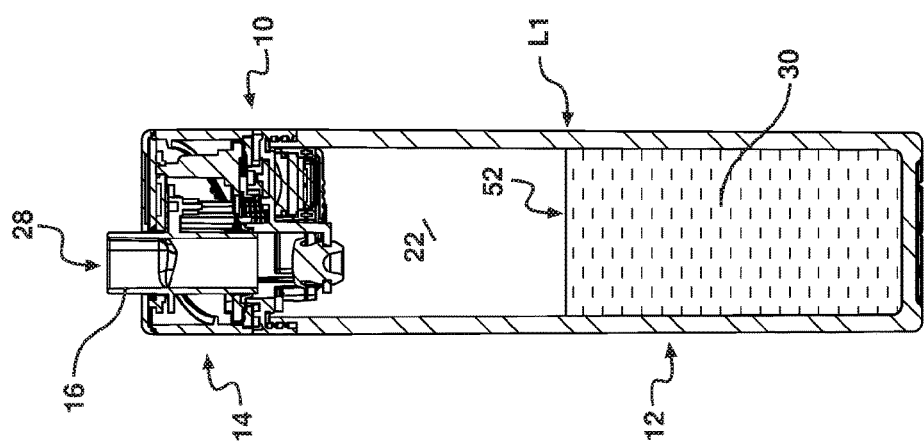
FIG. 12b is a side cross-sectional view of the lid assembly, apparatus and bottle of FIG. 12a, illustrating the spout in an extended position.
Figure 12A:
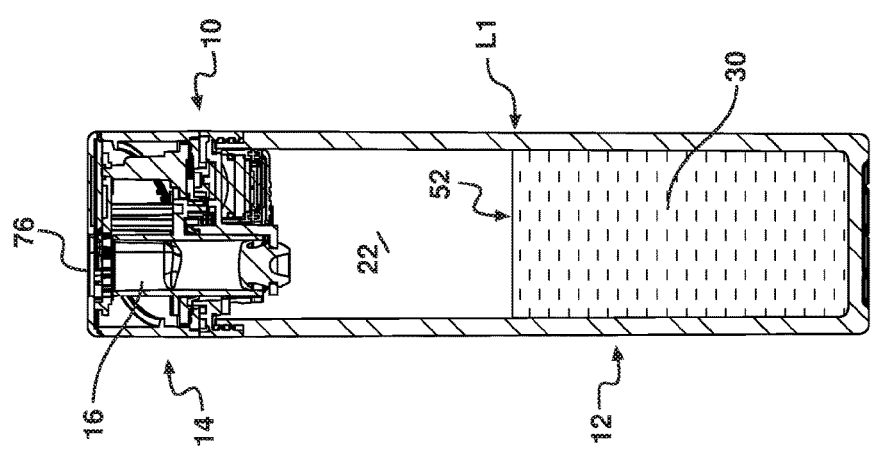
FIG. 12a is a side cross-sectional view of the lid assembly, containing the apparatus, and bottle of FIG. 7a, illustrating the spout in a retracted position.

FIGS. 12a to 12g illustrate the stages that the present embodiment of the apparatus 10 goes through during a drinking or pouring event. Not all the components are labelled in the figures so as to not obscure operation of the invention. FIG. 12a illustrates the spout 16 in a retracted positioned within the lid assembly 14 and covered by pivotable flap 76. The level of the fluid 30 in FIG. 12a is indicated as L1. FIG. 12b illustrates the spout 16 in an extended position once the latch mechanism 80 has been released allowing the main body 72 to rotate and the pivotable flap 76 to move out of the way. At this point the magnet 138 and reed switch 128 are positioned remote from each other as previously discussed and therefore the apparatus 10 is in an active or On mode.

The bottle 12 is then tilted, as indicated in FIG. 12c, until the water level comes into contact with the fluid contact pins 134, 136 of the proximity sensor 32, as illustrated in FIG. 12d. The tilt switch 126 is then activated and the microcontroller 122 takes a measurement of a first angle A of the bottle 12 by way of the angle sensor 34. The microcontroller 122 can then calculate the volume of fluid 30 contained within the bottle 12 at the start of the drinking or pouring event.

One of the advantages with the use of spaced apart pins 134, 136 as the proximity sensor 32, is that the only time the sensor will be activated is when both pins are submerged and an electrical current is able to flow. This means that when water is splashed around within the chamber 22 when the open bottle 12 is being carrier the proximity sensor 32 will not be actuated.

As the bottle 12 is tilted further, as illustrated in FIG. 12e, the fluid 30 flows out through the spout 16 from within the chamber 22. During the drinking or pouring event the fluid contact pins 134, 136 are completely submerged within the fluid 30 and a weak current flows therebetween.

Figure 12G:
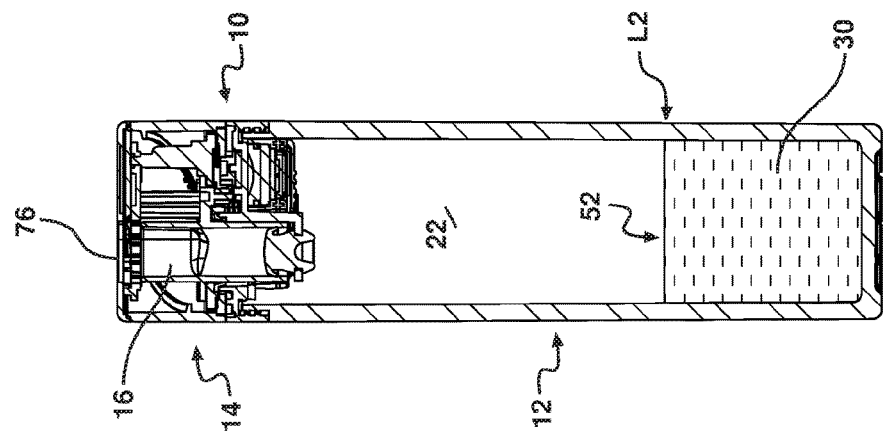
FIG. 12g is a side cross-sectional view of the lid assembly, apparatus and bottle of FIG. 12a in an upright position illustrating a lower water level after the drinking/pouring event.
Figure 12F:
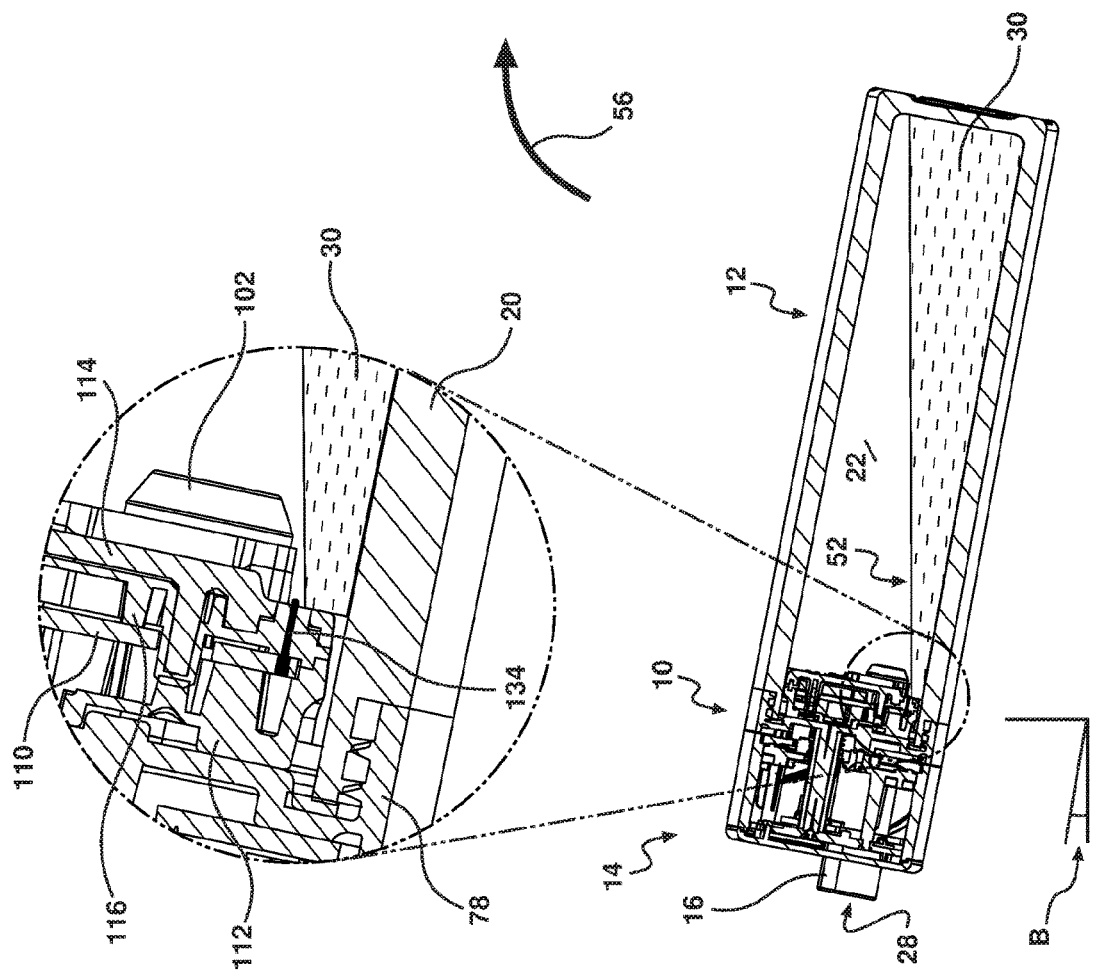
FIG. 12f is a side cross-sectional view of the lid assembly, apparatus and bottle of FIG. 12a in a fourth tilted position illustrating the water level dropping below the proximity sensors.

Once the drinking or pouring event has been completed the bottle 12 is tilted in the opposite direction, as illustrated in FIG. 12f, such that the fluid 30 stops flowing out through the spout 16 and the level of the fluid drops below the fluid contact pins 134, 136. The electrical current therefore stops flowing between the pins 134, 136 and a second angle B of the bottle 12 is then recorded using the angle sensor 34.

The microcontroller 122 is then used to determine the new level of the fluid 30 as indicated by L2 in FIG. 12g. In this way the volume of fluid 30 that has passed through the outlet during the drinking or pouring event can be calculated. This data can be utilised to indicate to a user whether they have consumed sufficient fluid, in light of their present circumstances, to maintain suitable hydration.

Figure 13A:
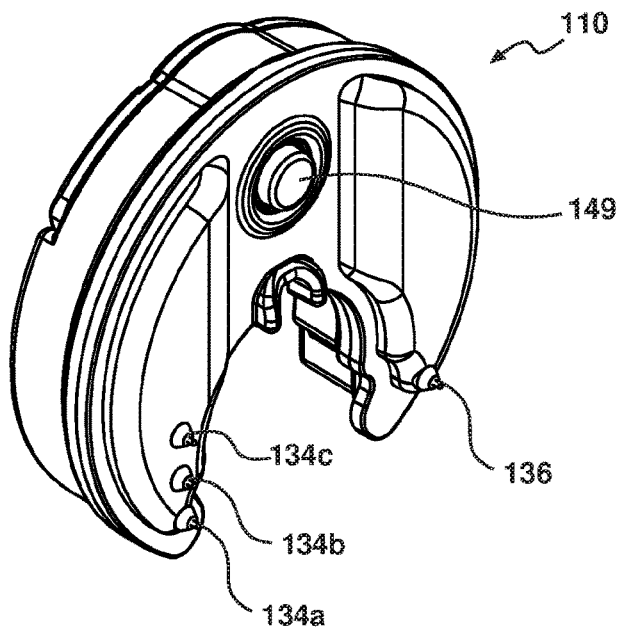
FIG. 13a is an underside perspective view of the communication module of another embodiment illustrating a first contact pin and three secondary contact pins.
Figure 13B:
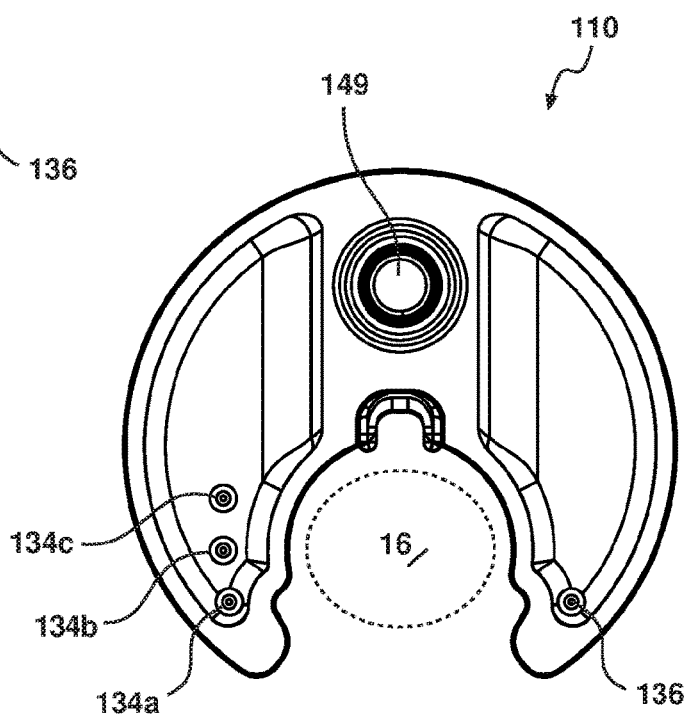
Figure 13C:
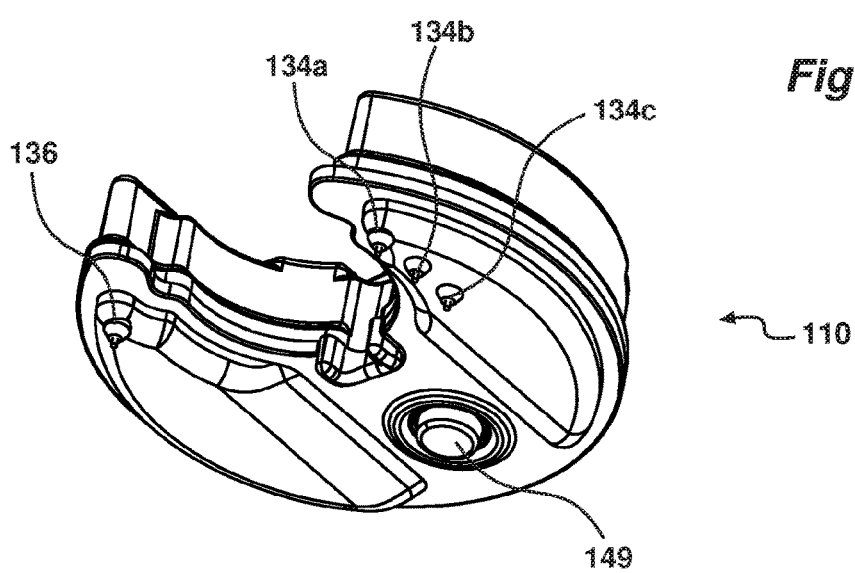
Figure 13D:
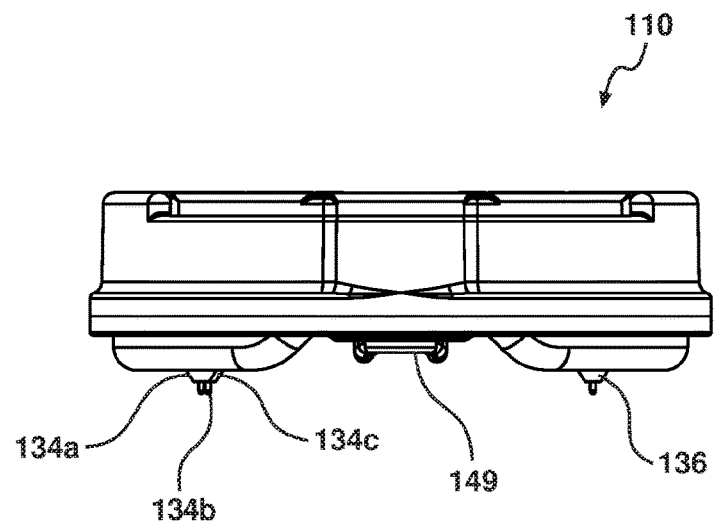
Figure 14:
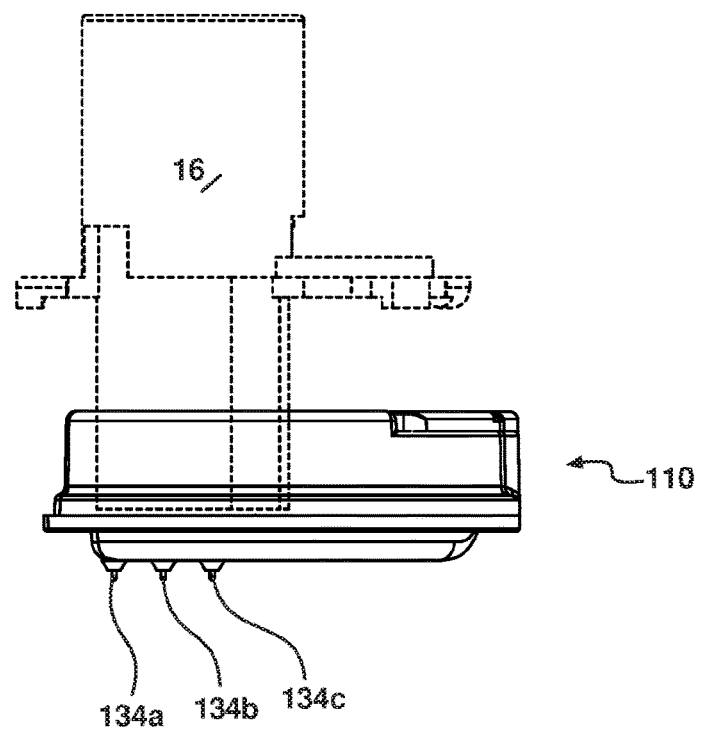
FIG. 14 is a side view of the communication module of FIG. 13a indicating the position of the spout.

FIGS. 13a to 14 illustrate another embodiment of the support frame 110, in this case being a communication module or BLUETOOTH® module. As illustrated in the figures, a first contact pin 136 is located on one side of the spout 16 and three spaced apart secondary contact pins 134a, 134b, 134c are located on an opposite side of the spout 16, such that when the bottle 12 is positioned in a generally horizontal arrangement the three secondary contact pins 134a, 134b, 134c are spaced apart along a generally vertical axis as shown in FIG. 13b. As further illustrated in FIG. 13b, the lowest of the three secondary contact pins 134a and the first contact pin 136 are positioned generally along a horizontal plane and the middle 134b and upper 134c secondary contact pins are set progressively higher relative to the first contact pin 136. In this way, as the height of the water increases, during tipping of the bottle, the secondary contact pins 134a, 134b, 134c are progressively covered.

The reader should appreciate, that initially the first contact pin 136 and secondary contact pin 134a are covered and a weak electrical current is caused to flow therebetween. Then, as the height of the water increases, during tipping of the bottle 12, the secondary contact pin 134b is covered and a weak electrical current is caused to flow between it and the first contact pin 136. Finally, as the height of the water further increases the secondary contact pin 134c is covered and a weak electrical current is caused to flow between it and the first contact pin 136.

This sequentially activation of the secondary contact pins 134a, 134b, 134c improves the accuracy of the proximity sensor and overcomes some of the issues associated with slop of the water within the bottle during movement.

Figure 15:
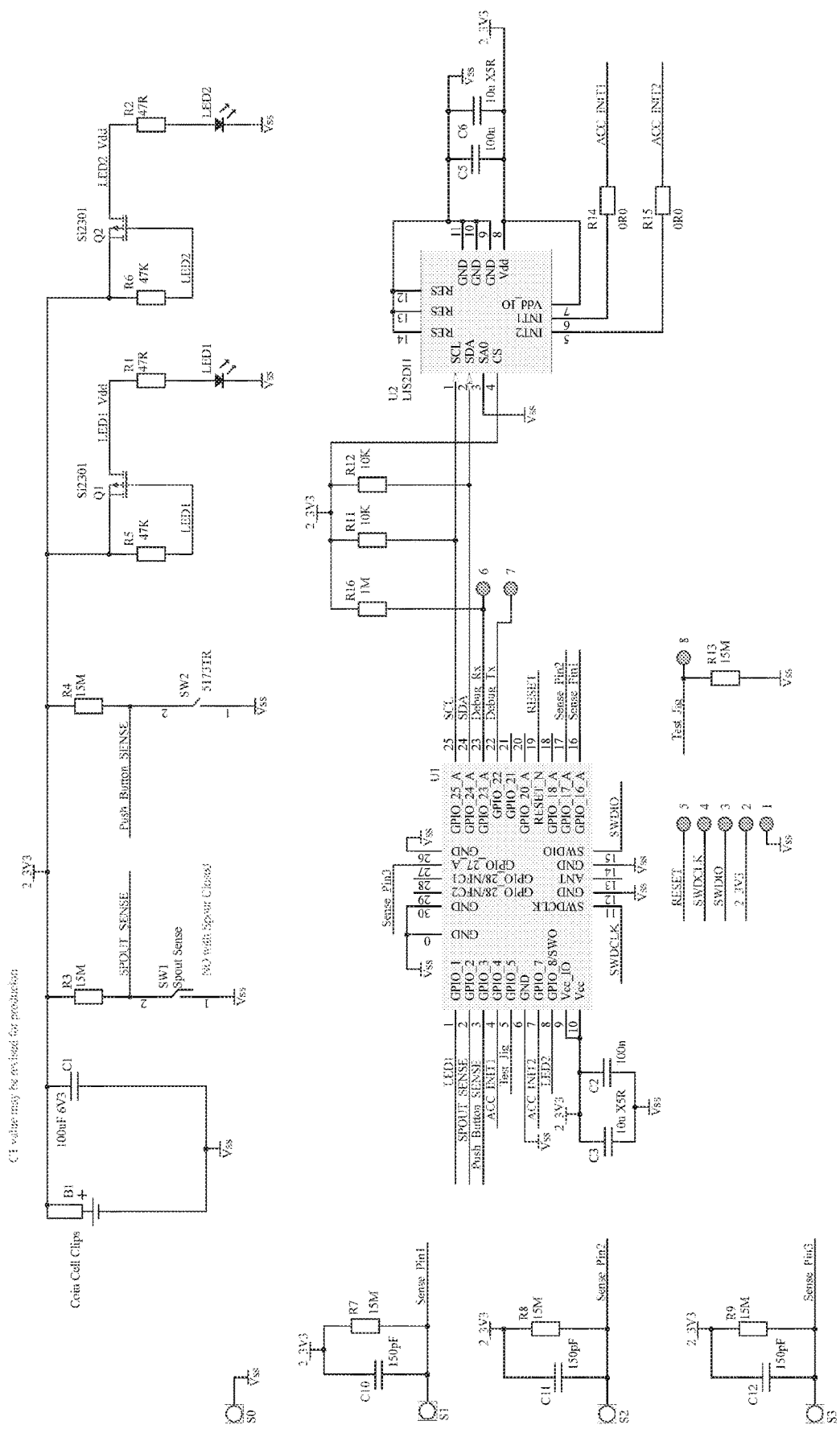

As further illustrated in FIG. 13a-14, the communication module includes an LED display light 149 that is used to notify the user of drinking events or hydration levels. FIG. 15 illustrates one embodiment of the circuit layout diagram of the communication module, although other configurations are possible without departing from the spirit or scope of the invention.

Figure 16:
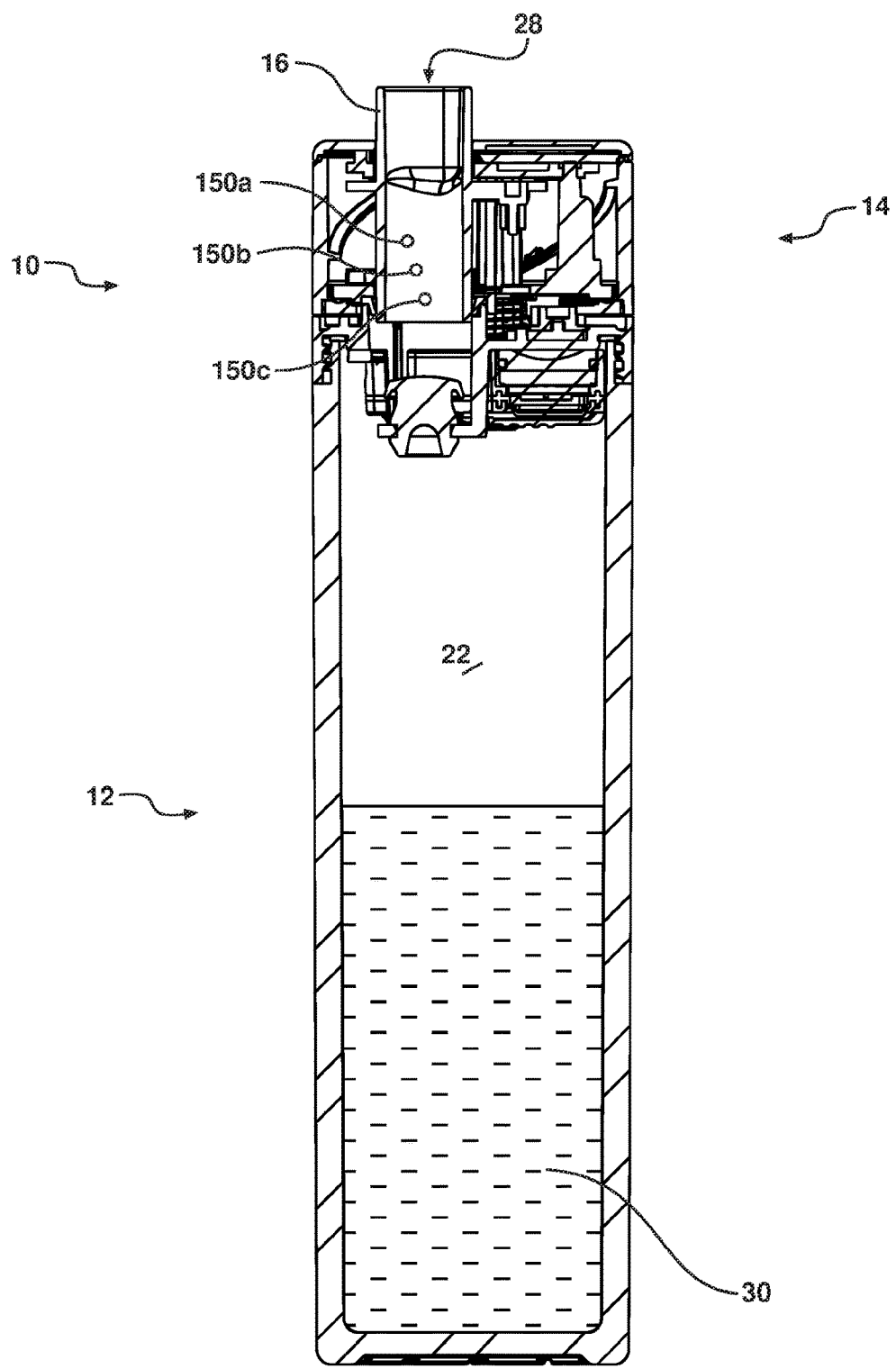
FIG. 16 is a side cross-sectional view of yet another embodiment of the present invention illustrating vertically spaced apart proximity sensors.

FIG. 16 illustrates another embodiment of the apparatus 10, which includes vertically spaced apart proximity sensors 150a, 150b, 150c. In this way as the fluid 30 progressively enters the spout 16 the proximity sensors are sequentially submerged. This may be done to avoid a false reading as a result of slop of fluid within the container when it is tilted rapidly.

The skilled addressee will now appreciate the advantages of the illustrated invention over the prior art. In one form the invention provides a way of measuring usage of a fluid from a container that can be incorporated into different shape and size bottles having known volumes. The apparatus is able to track the usage of the fluid even when the bottle is being carried. Furthermore, the use of low power sensors and components that can be switched Off or into a standby mode, means that the apparatus has a longer usable lifespan between changing or charging of the battery. The apparatus accurately measures the fluid usage from the bottle which means that the data can be used to predict the hydration of a user.

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. An apparatus for measuring fluid usage from a container comprising:
   a proximity sensor or sensors positioned in or adjacent an outlet of said container and configured to monitor the presence or absence of said fluid within or adjacent said outlet;
   wherein the outlet comprises a spout by which a user is able drink or otherwise access the fluid from within the container, the spout being fixedly attached to said container or is movable relative to a body of the container;
   an angle sensor for determining a first angle of said container when said fluid begins to flow through the outlet, and for determining a second angle of said container when said fluid stops flowing through said outlet, said angle sensor being activated by said proximity sensor or sensors to collect angle data relating to the first angle and the second angle; and
   a transmitter for sending said angle data from the angle sensor or processed data therefrom, to a computing device and/or a display unit; wherein the angle data or processed data is used by the computing device and/or display unit to calculate or indicate a volume of the fluid having passed through the outlet; and a controller for receiving proximity data from the proximity sensor or sensors and said angle data from the angle sensor, wherein the data or processed data is transferred to the transmitter for transmission thereof;

wherein the container is generally elongate and wherein the proximity sensor or sensors comprises a first contact pin located on one side of the spout and three spaced apart secondary contact pins located on an opposite side of the spout, such that when the generally elongate container is positioned along a generally horizontal plane, the three secondary contact pins are spaced apart along a generally vertical axis, whereby as a longitudinal axis of the container approaches said generally horizontal plane, the secondary contact pins are progressively covered, whereby a weak electrical current is sequentially caused to flow between the first contact pin and each of the secondary contact pins as they are progressively covered.

2. The apparatus in accordance with claim 1, wherein the proximity sensor or sensors comprises at least two fluid contact pins, such that when two or more of said at least two fluid contact pins are submerged in the fluid, a weak electrical current is caused to flow therebetween, and to thereby indicate the presence of said fluid adjacent said at least two fluid contact pins.

3. The apparatus in accordance with claim 1, wherein said volume of the fluid having passed through the outlet or spout is used to calculate fluid consumption by a user, and to thereby determine an approximate hydration of said user.

4. The apparatus in accordance with claim 1, wherein said volume of the fluid having passed through the outlet or spout is during a single drinking or pouring event.

5. The apparatus in accordance with claim 1, wherein the container is a bottle including a base and upwardly extending circumferential wall delineating a chamber or reservoir for holding the fluid, a reversibly attachable lid assembly is connected to a top edge of the wall for sealing the chamber or reservoir and the spout being movable along a generally vertical axis and being attached to an upper part of the lid assembly and being closable to seal said chamber, the circumferential wall being generally cylindrical and vertically elongate, and wherein a generally disc-shaped lid assembly is attached over an open upper end of the bottle.

6. The apparatus in accordance claim 1, further including a rotation sensor for determining the location of the proximity sensor or sensors relative to a longitudinal axis of the container when tilted.

7. The apparatus in accordance with claim 1, further including a power source and a processor for processing the data from the proximity sensor or sensors before the processed data is sent to the computing device and/or the display unit by way of the transmitter.

8. The apparatus in accordance with claim 7, wherein the processor or a controller or a wirelessly linked computing device is in communication with the display unit and is in the form of one or more of coded red, orange, and green LED lights attached to said container, which LED lights indicate if the required amount of fluid has been consumed by the user.

9. The apparatus in accordance with claim 1, further including an accelerometer for measuring the acceleration of the container in order to estimate or calculate a rate of slop if the container is tilted rapidly.

10. The apparatus in accordance with claim 1, wherein movement of the container is measured along three axes in order to calculate an orientation and tilt of the container.

11. A lid assembly for attachment to a generally elongate container for measuring fluid usage therefrom, said lid assembly including:
a proximity sensor or sensors positioned in or adjacent an outlet of said lid assembly and configured to monitor the presence or absence of said fluid within or adjacent said outlet, wherein the outlet comprises a spout by which a user is able drink or otherwise access the fluid from within the container, the spout being fixedly attached to said lid assembly or is movable relative to a body of the lid assembly;
an angle sensor for determining a first angle of said lid assembly when said fluid begins to flow through the outlet and for determining a second angle of said lid assembly when said fluid stops flowing through said outlet, said angle sensor being activated by said proximity sensor or sensors to collect angle data relating to the first angle and the second angle;
a transmitter for sending said angle data from the angle sensor or processed data therefrom, to a computing device and/or a display unit; and
a controller for receiving proximity data from the proximity sensor or sensors and said angle data from the angle sensor, wherein the data or processed data is transferred to the transmitter for transmission thereof;
wherein the proximity sensor or sensors comprises a first contact pin located on one side of the spout and three spaced apart secondary contact pins located on an opposite side of the spout, such that when the generally elongate container is positioned along a generally horizontal plane, the three secondary contact pins are spaced apart along a generally vertical axis, whereby as a longitudinal axis of the lid assembly approaches said generally horizontal plane, the secondary contact pins are progressively covered, whereby a weak electrical current is sequentially caused to flow between the first contact pin and each of the secondary contact pins as they are progressively covered;
calculating or indicating, with the computing device and/or the display unit, a volume of the fluid having passed through the outlet from the angle data or processed data; and
calculating with the computing device and/or the display unit, a fluid consumption by a user from the volume of fluid passing through the outlet.

12. A method of measuring fluid usage from a container, said method including the steps of:
providing a container which is generally elongate;
locating a proximity sensor or sensors within or adjacent an outlet of said container, wherein the outlet comprises a spout by which a user is able drink or otherwise access the fluid from within the container, and the spout is fixedly attached to the container or is movable relative to a body of the container;
configuring the proximity sensor or sensors to monitor the presence or absence of said fluid within or adjacent said outlet, wherein the proximity sensor or sensors comprises a first contact pin located on one side of the spout and three spaced apart secondary contact pins located on an opposite side of the spout, such that when the generally elongate container is positioned along a generally horizontal plane, the three secondary contact pins are spaced apart along a generally vertical axis, whereby as a longitudinal axis of the container approaches said generally horizontal plane, the secondary contact pins are progressively covered, whereby a weak electrical current is sequentially caused to flow between the first contact pin and each of the secondary contact pins as they are progressively covered;

attaching an angle sensor to said container, wherein the angle sensor is configured to measure a first angle of said container when said fluid begins to flow through the outlet, and is configured to measure a second angle of said container when said fluid stops flowing through said outlet;

attaching a transmitter to said container, wherein the transmitter is configured to send angle data collected by the angle sensor or processed data therefrom to a computing device and/or a display unit;

inclining the container in a first direction such that the fluid is caused to contact said proximity sensor or sensors and flow out through said outlet;

activating the angle sensor by said proximity sensor or sensors to measure said first angle;

moving the container in a second direction such that the fluid disengages from said proximity sensor or sensors and stops flowing out through said outlet;

activating the angle sensor by said proximity sensor or sensors to measure said second angle;

demarcating an event as a time between when the fluid is caused to flow out through said outlet and when the fluid stops flowing out through said outlet;

receiving, with a controller, the proximity data from the proximity sensor or sensors and angle data from the angle sensor;

transferring the angle data or processed data from the controller to the transmitter;

transmitting the angle data or processed data from the transmitter to the computing device and/or the display unit;

calculating, with the computing device using the transmitted angle data or processed data, a volume of the fluid having passed through the outlet during said event; and displaying, with the display unit, an indicia to a user indicating said volume of the fluid having passed through the outlet during said event or information relating thereto.

* * * * *